United States Patent
Dong et al.

(10) Patent No.: US 10,841,362 B2
(45) Date of Patent: Nov. 17, 2020

(54) ENHANCED M2M CONTENT MANAGEMENT BASED ON INTEREST

(71) Applicant: Convida Wireless, LLC, Wilmington, DE (US)

(72) Inventors: Lijun Dong, San Diego, CA (US); Chonggang Wang, Princeton, NJ (US); Dale N. Seed, Allentown, PA (US)

(73) Assignee: Convida Wireless, LLC, Wilmington, DE (US)

(*) Notice: Subject to any disclaimer, the term of this patent is extended or adjusted under 35 U.S.C. 154(b) by 628 days.

(21) Appl. No.: 14/491,091

(22) Filed: Sep. 19, 2014

(65) Prior Publication Data
US 2015/0088979 A1    Mar. 26, 2015

Related U.S. Application Data

(60) Provisional application No. 61/880,435, filed on Sep. 20, 2013.

(51) Int. Cl.
*H04L 29/08*    (2006.01)
*H04W 4/70*     (2018.01)

(52) U.S. Cl.
CPC .............. *H04L 67/10* (2013.01); *H04L 67/16* (2013.01); *H04L 67/2852* (2013.01); *H04L 67/306* (2013.01); *H04W 4/70* (2018.02)

(58) Field of Classification Search
CPC ..... H04L 67/10; H04L 67/16; H04L 67/2852; H04L 67/306; H04W 4/005
USPC .......................... 709/203, 216, 217; 380/255
See application file for complete search history.

(56) References Cited

U.S. PATENT DOCUMENTS

| | | | |
|---|---|---|---|
| 9,432,450 B2 | 8/2016 | Skaaksrud et al. | |
| 2003/0177178 A1* | 9/2003 | Jones | G06F 17/30067 709/203 |
| 2005/0132049 A1 | 6/2005 | Inoue et al. | |
| 2009/0182815 A1* | 7/2009 | Czechowski, III | H04L 67/104 709/206 |
| 2010/0085959 A1* | 4/2010 | Vohra | H04L 65/1046 370/352 |

(Continued)

FOREIGN PATENT DOCUMENTS

| | | |
|---|---|---|
| CN | 102104883 A | 6/2011 |
| CN | 102804738 A | 11/2012 |

(Continued)

OTHER PUBLICATIONS

Written Opinion of Korean Patent Application 10-2016-7010226 by the Korean Patent Office.*

(Continued)

*Primary Examiner* — Tonia L Dollinger
*Assistant Examiner* — Schquita D Goodwin
(74) *Attorney, Agent, or Firm* — BakerHostetler

(57) ABSTRACT

Methods, devices, and systems are disclosed for an M2M Interest Function. An M2M Interest Function may receive requests from users to publish the users' personal interests in particular data identify relationships and patterns in the data. Associated data may then be stored in a single best location for such data based on various criteria rather than on separate M2M Gateways or M2M Servers. This location may be provided to users interested in such data. Relationship and association data may be provided to M2M gateways.

3 Claims, 19 Drawing Sheets

(56) References Cited

U.S. PATENT DOCUMENTS

| | | | |
|---|---|---|---|
| 2010/0312861 A1 | 12/2010 | Kolhi et al. | |
| 2011/0213871 A1* | 9/2011 | DiGirolamo | H04L 67/12 709/223 |
| 2012/0047551 A1* | 2/2012 | Pattar | H04W 4/00 726/1 |
| 2012/0166538 A1* | 6/2012 | Son | H04L 67/02 709/204 |
| 2012/0214506 A1* | 8/2012 | Skaaksrud | H04W 4/02 455/456.1 |
| 2012/0271908 A1* | 10/2012 | Luna | G06F 9/5016 709/216 |
| 2013/0042123 A1* | 2/2013 | Smith | G06F 9/5094 713/300 |
| 2013/0179534 A1* | 7/2013 | Sanghavi | H04L 67/20 709/217 |
| 2013/0208888 A1* | 8/2013 | Agrawal | H04L 67/1021 380/255 |
| 2013/0246588 A1* | 9/2013 | Borowicz | G06F 16/27 709/220 |
| 2013/0343231 A1* | 12/2013 | Foti | H04L 12/1407 370/259 |
| 2014/0067902 A1* | 3/2014 | Wang | H04L 67/02 709/201 |
| 2014/0068180 A1* | 3/2014 | Hsieh | G06F 15/17331 711/113 |
| 2014/0129006 A1* | 5/2014 | Chen | G05B 15/02 700/90 |
| 2014/0164563 A1* | 6/2014 | Leekley | H04L 67/1074 709/217 |
| 2014/0215082 A1* | 7/2014 | Backholm | H04L 65/4084 709/227 |
| 2014/0221032 A1* | 8/2014 | Yang | H04W 4/70 455/509 |
| 2014/0280735 A1* | 9/2014 | Kalaboukis | G06Q 30/02 709/217 |
| 2014/0317170 A1* | 10/2014 | Hughes | H04L 41/145 709/203 |
| 2014/0355420 A1* | 12/2014 | Tran | H04W 24/02 370/225 |
| 2015/0006696 A1* | 1/2015 | Hershberg | H04L 67/12 709/223 |
| 2015/0242412 A1* | 8/2015 | Mathur | G06F 3/0605 707/665 |
| 2015/0271251 A1* | 9/2015 | Melander | H04L 67/08 709/217 |
| 2015/0350348 A1* | 12/2015 | Yin | H04W 4/70 709/202 |
| 2015/0358874 A1* | 12/2015 | Ahn | H04L 12/66 370/331 |
| 2016/0006815 A1* | 1/2016 | Dong | G06F 9/46 709/204 |
| 2016/0203416 A1* | 7/2016 | Kvernvik | G06N 99/005 706/12 |
| 2016/0219109 A1* | 7/2016 | Blahaerath | H04L 67/1097 |

FOREIGN PATENT DOCUMENTS

| | | |
|---|---|---|
| CN | 103081432 A | 5/2013 |
| CN | 103166931 A | 6/2013 |
| JP | 2000-276425 A | 10/2000 |
| JP | 2003-030087 A | 1/2003 |
| JP | 2005-275937 A | 10/2005 |
| JP | 2007-073004 A | 3/2007 |
| JP | 2007-310673 A | 11/2007 |
| JP | 2007-318289 A | 12/2007 |
| JP | 2009-9484 A | 1/2009 |
| WO | WO 2013-106188 | 7/2013 |

OTHER PUBLICATIONS

Minsu Kim, Effective M2M Gateway Selection Algorithms for Geographical Region-based Query, Nov. 2010, IEEE (Year: 2010).*

ETSI "Home Appliance Use Case as Connected Consumer", ETSI TC M2M#08 M2M(10)0030, Sophia Antipolis, France Jan. 18-22, 2010, 3 pages.

ETSI "Surveillance Use Case as Connected Consumer", ETSI TC M2M#08 M2M(10)0029r32, Sophia Antipolis, France Jan. 18-22, 2010, 4 pages.

European Telecommunications Standards Institute (ETSI), TS 102 690 V1.2.1; Machine-to-Machine Communications (M2M); Functional Architecture, Jun. 2013, 279 pages.

European Telecommunications Standards Institute (ETSI), TS 102 921 V1.2.1; Machine-to-Machine communications (M2M); mIa, dIa and mId interfaces, Jun. 2013, 542 pages.

International Patent Application No. PCT/US2014/056527: International Search Report and the Written Opinion dated Dec. 4, 2014, 12 pages.

OneM2M-TS-0001 oneM2M Functional Architecture-V-0.0.3, Jun. 8, 2013, 11 pages.

Korean Patent Application No. 10-2016-7010226: Notice of Preliminary Rejection dated Aug. 31, 2017, 4 pages (translation not available).

Japanese Patent Application No. 2016-515408: Notice of Reasons for Rejection dated May 26, 2017, 4 pages.

* cited by examiner

| 1200 | | |
|---|---|---|
| Requester 1 | Resource 1 | Time |
| | ... | ... |
| | Resource m1 | Time |
| ... | | |
| Requester k | Resource 1 | Time |
| | ... | ... |
| | Resource mk | Time |

1902

☐ Enable Interest Function

User Name

☐ Select Interest Data

☐ Show Interest Data

-Camera A Data

-Temperature Data

User Name

☐ Requested Interest Group Location

☐ Server A

☐ Server B

☐ Server C

*FIG. 19C*

ENHANCED M2M CONTENT MANAGEMENT BASED ON INTEREST

This application claims the benefit of, and incorporates herein by reference, U.S. Provisional Application 61/880,435 filed Sep. 20, 2013.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate over a network, such as the Internet. IoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold. As will be appreciated, the IoT has the potential to include many millions of devices.

In current implementations, M2M devices provide data to M2M gateways, with data being stored on the particular M2M gateway to which a particular M2M Device is registered. Therefore, a user may need to go to different M2M Gateways to retrieve this data, which is inefficient. Even where data from different M2M devices is stored on the same M2M gateway, a user must retrieve the content using distinct data requests, requiring the same effort as if the M2M devices used different M2M gateways.

SUMMARY

Disclosed herein are methods, devices, and systems for an M2M Interest Function. In an embodiment, an M2M Interest Function may receive requests from users to publish the users' personal interests, in particular identifying relationships and patterns in the data. Associated data may then be stored in a single best location based on various criteria rather than on separate M2M Gateways or M2M Servers. This location may be provided to users interested in such data. Relationship and association information may be provided to M2M gateways.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIGS. 19A-C are diagrams that illustrate exemplary Graphical User Interfaces (GUIs) that can be used with interest-based content management systems.

DETAILED DESCRIPTION OF ILLUSTRATIVE EMBODIMENTS

Figure 1:
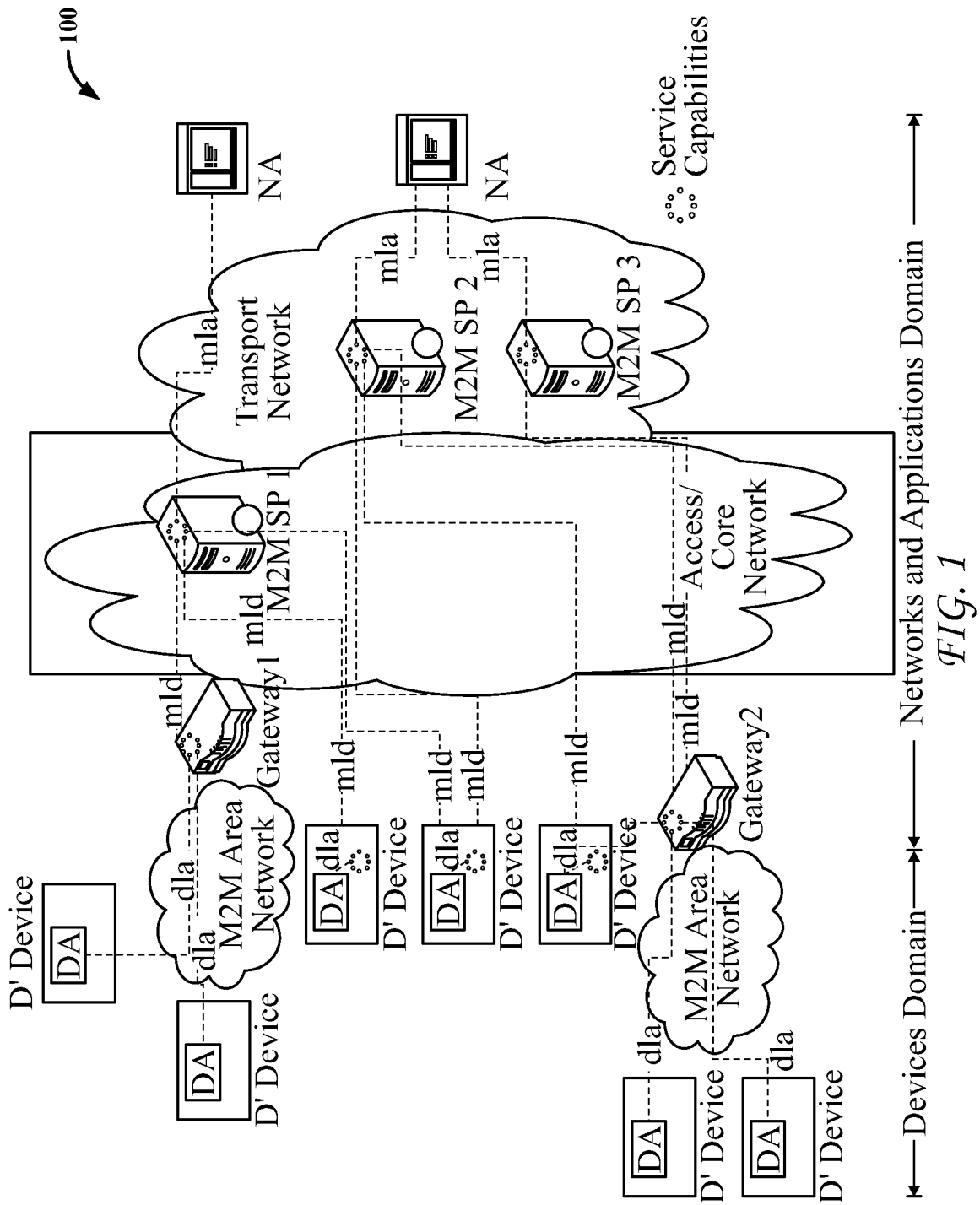
FIG. 1 is a diagram that illustrates the European Telecommunications Standards Institute (ETSI) M2M architecture.

FIG. 1 is a diagram that illustrates the European Telecommunications Standards Institute (ETSI) M2M architecture 100. ETSI M2M defines a set of service capabilities that may be used through a Service Capabilities Layer (SCL) that provide function that are shared by different applications. A SCL may use core network functionalities via a set of exposed interfaces. Additionally, a SCL may interface to one or several core networks.

Device applications (DAs) may reside in an M2M Device that implements M2M service capabilities or alternatively may reside in an M2M Device that does not implement M2M Service Capabilities. The mla reference point allows an application to access the M2M Service Capabilities in the networks and applications domain. The dla reference point allows an application residing in an M2M Device, for example a DA, to access the different M2M service capabilities in the same M2M Device or in an M2M Gateway and allows an application residing in an M2M Gateway, for example a gateway application (GA), to access the different M2M service capabilities in the same M2M Gateway. The mld reference point allows M2M service capabilities residing in an M2M Device or M2M Gateway to communicate with the M2M service capabilities in the network and applications Domain. The mld uses core network connectivity functions as an underlying layer.

Figure 2A:
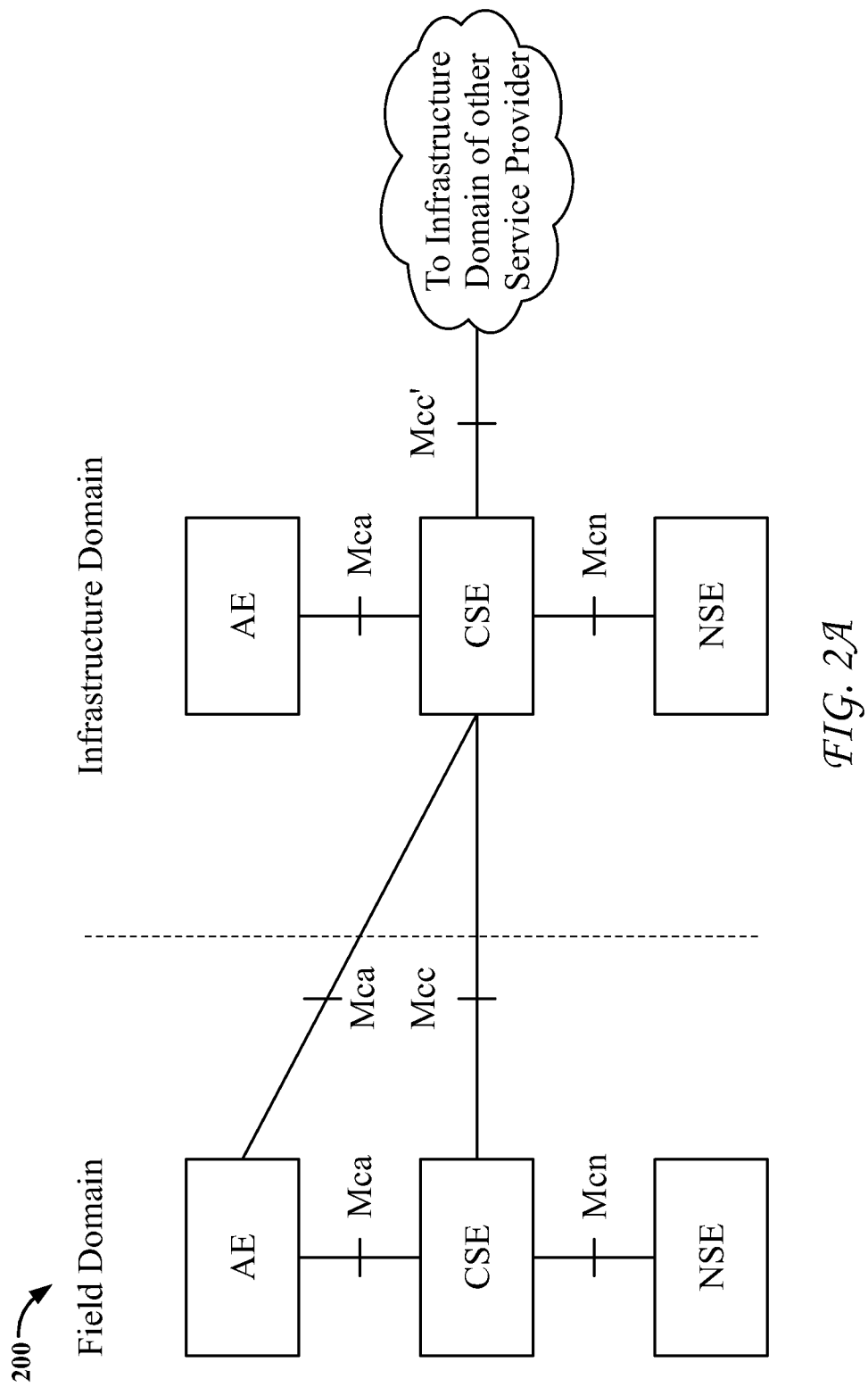
FIG. 2A is a diagram that illustrates an exemplary oneM2M functional architecture.
Figure 2B:
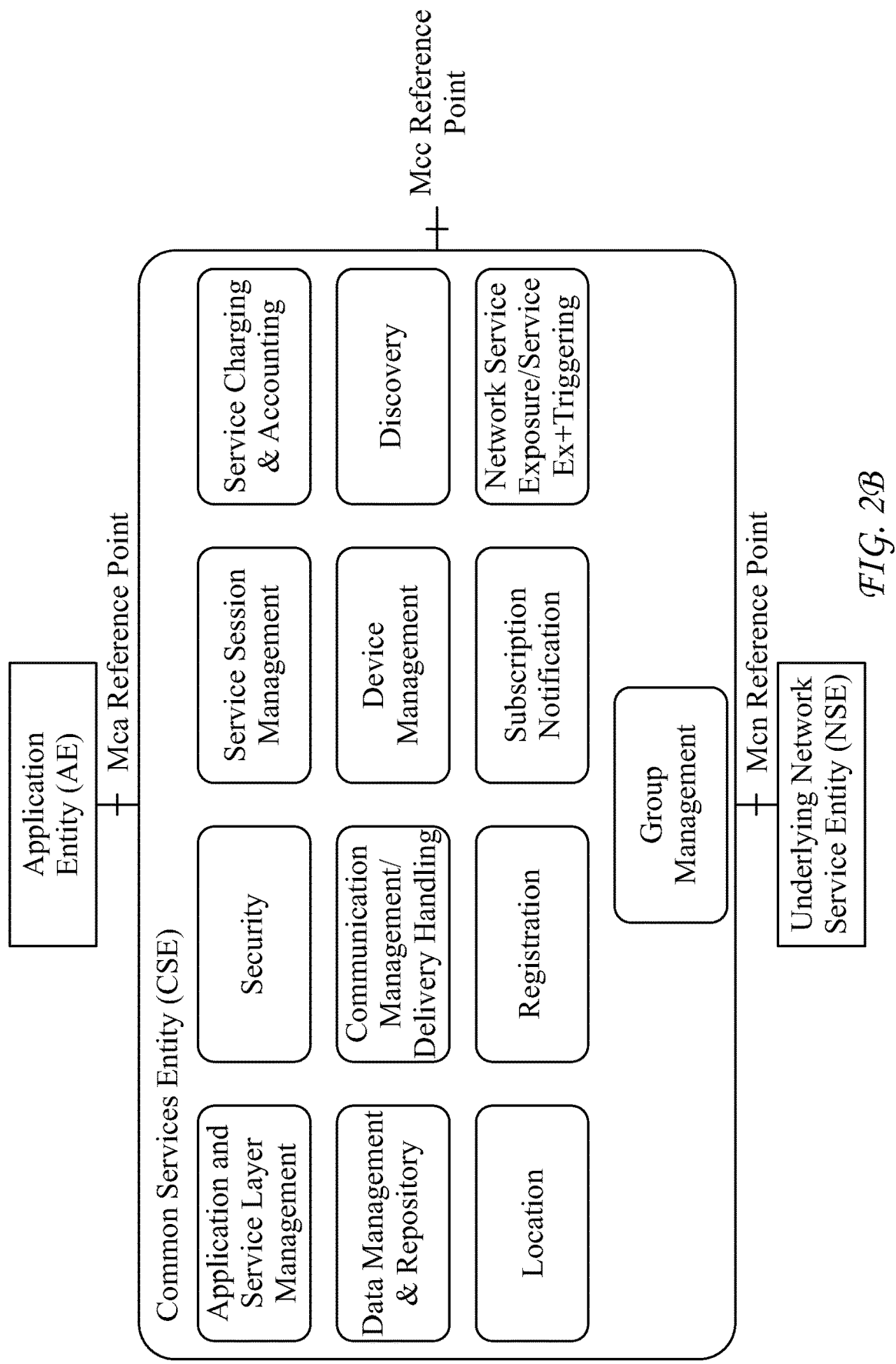
FIG. 2B is a diagram that illustrates the CSFs under development for a oneM2M architecture.

FIG. 2A is a diagram that illustrates an exemplary oneM2M functional architecture 200. The oneM2M standard under development defines a Service Layer called "Common Service Entity (CSE)" as illustrated in FIG. 2. The purpose of the Service Layer is to provide "horizontal" services that can be utilized by different 'vertical' M2M silo systems and applications, such as e-Health, fleet management, and smart homes. CSE supports four reference points. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. CSE contains multiple logical functions called "Common Service Functions (CSFs)", such as "Discovery", "Data Management & Repository". FIG. 2B is a diagram that illustrates the CSFs under development for a oneM2M architecture.

oneM2M enables the following types of Nodes: Application Service Nodes (ASNs), Application Dedicated Node (ADNs), Middle Nodes (MNs) and Infrastructure Nodes (INs).

An Application Service Node (ASN) is a Node that contains one CSE and contains at least one AE. An example of physical mapping is an ASN that resides in an M2M Device.

An Application Dedicated Node (ADN) is a Node that contains at least one AE and does not contain a CSE. An example of physical mapping is an ADN that resides in a constrained M2M Device.

A Middle Node (MN) is a Node that contains one CSE and contains zero or more AEs. An example of physical mapping is an MN that resides in an M2M Gateway.

An Infrastructure Node (IN) is a Node that contains one CSE and contains zero or more AEs. An example of physical mapping is an IN that resides in an M2M Service Infrastructure.

Figure 3:
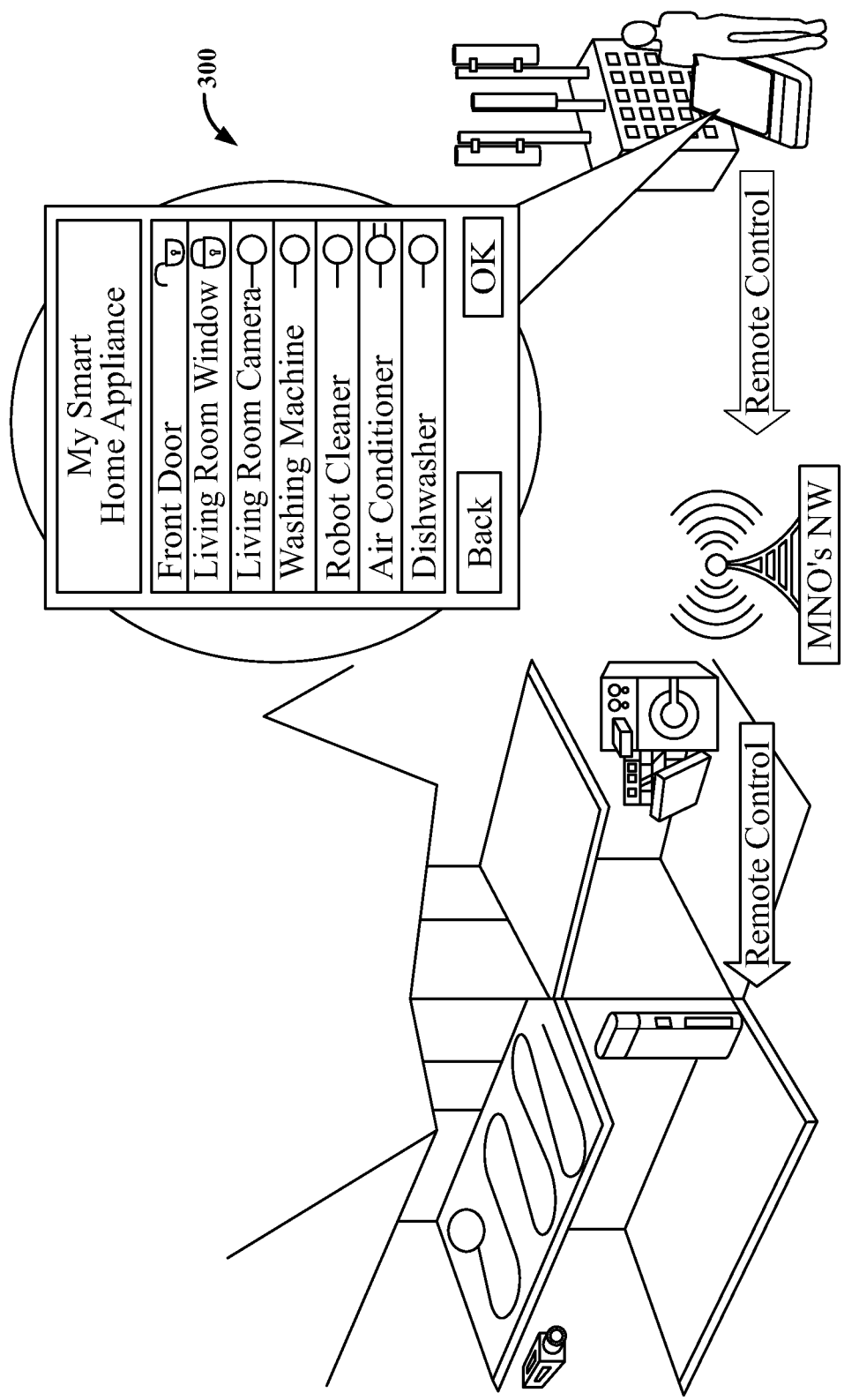
FIG. 3 is a block diagram that illustrates an embodiment where a user may request remote control of home appliances when the user is outside his or her home.

FIG. 3 is a block diagram that illustrates an embodiment where a user may request remote control of home appliances when the user is outside his or her home. For example, when it is cold outside and the user wants to make his or her home warm before the user returns home, or if the user wants to adjust the temperature of a room based on occupants currently in the room (e.g., children, pets) the user may turn on or off an air-conditioner by remote control device, for example using the exemplary non-limiting system 300 shown in FIG. 3.

Figure 4:
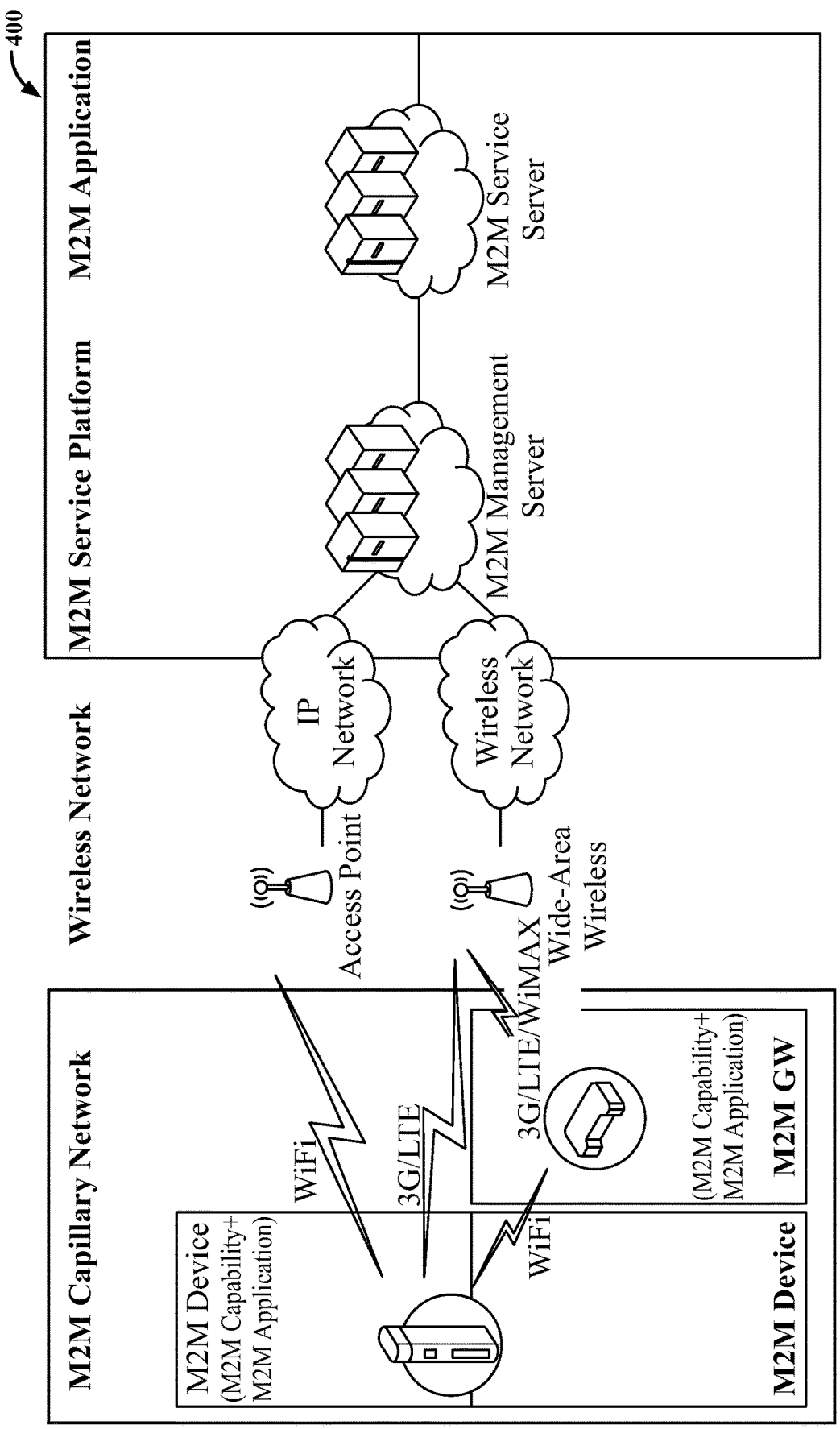
FIG. 4 is a diagram that illustrates an exemplary non-limiting architecture that may support a remote control.

FIG. 4 is a diagram that illustrates an exemplary non-limiting architecture 400 that may support a remote control. A user may also wish to view streaming video data from a surveillance camera configured at the user's home (e.g., view children, pets) when the user is not at home.

Figure 5:
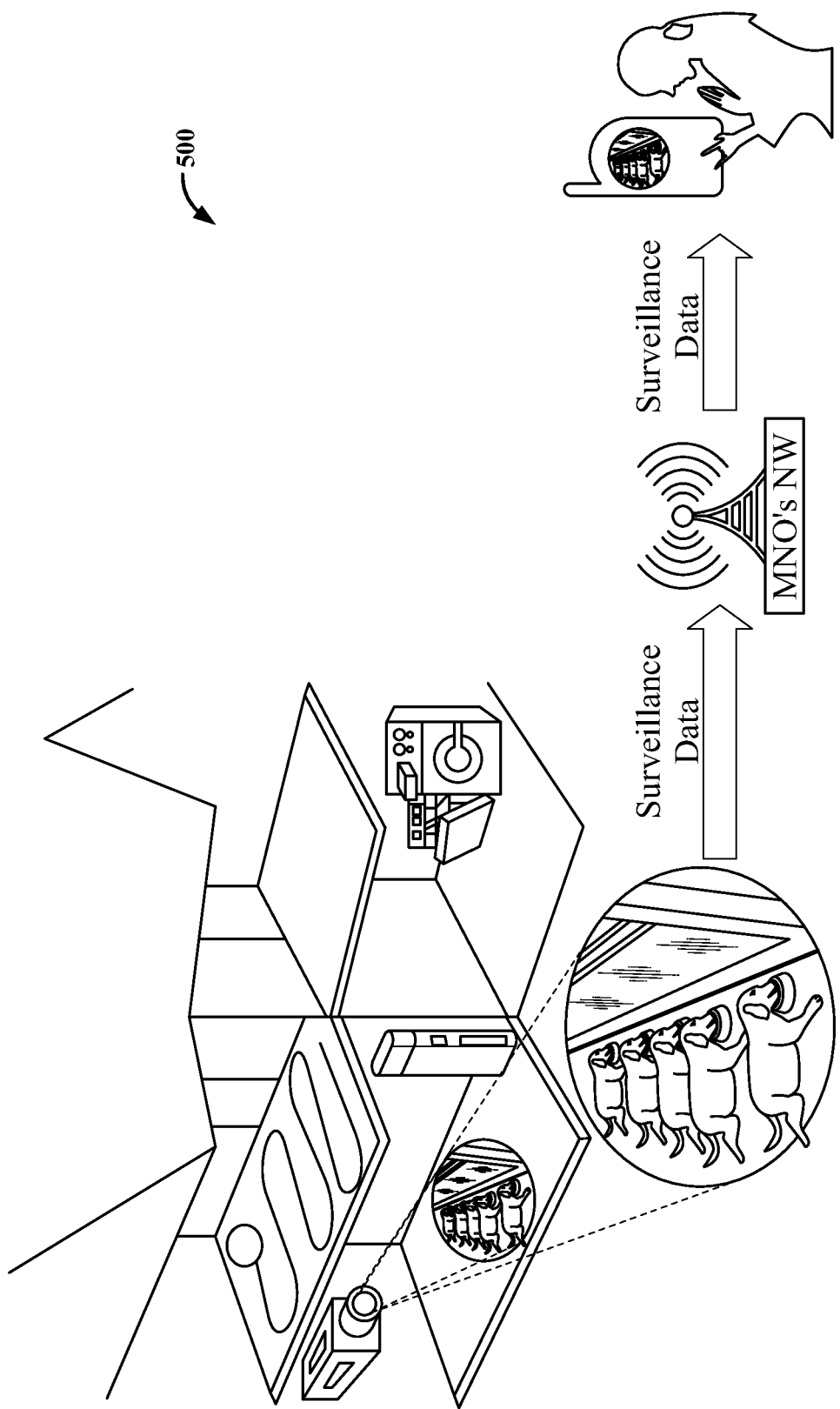
FIG. 5 is a diagram that illustrates streaming video from a surveillance camera.
Figure 6:
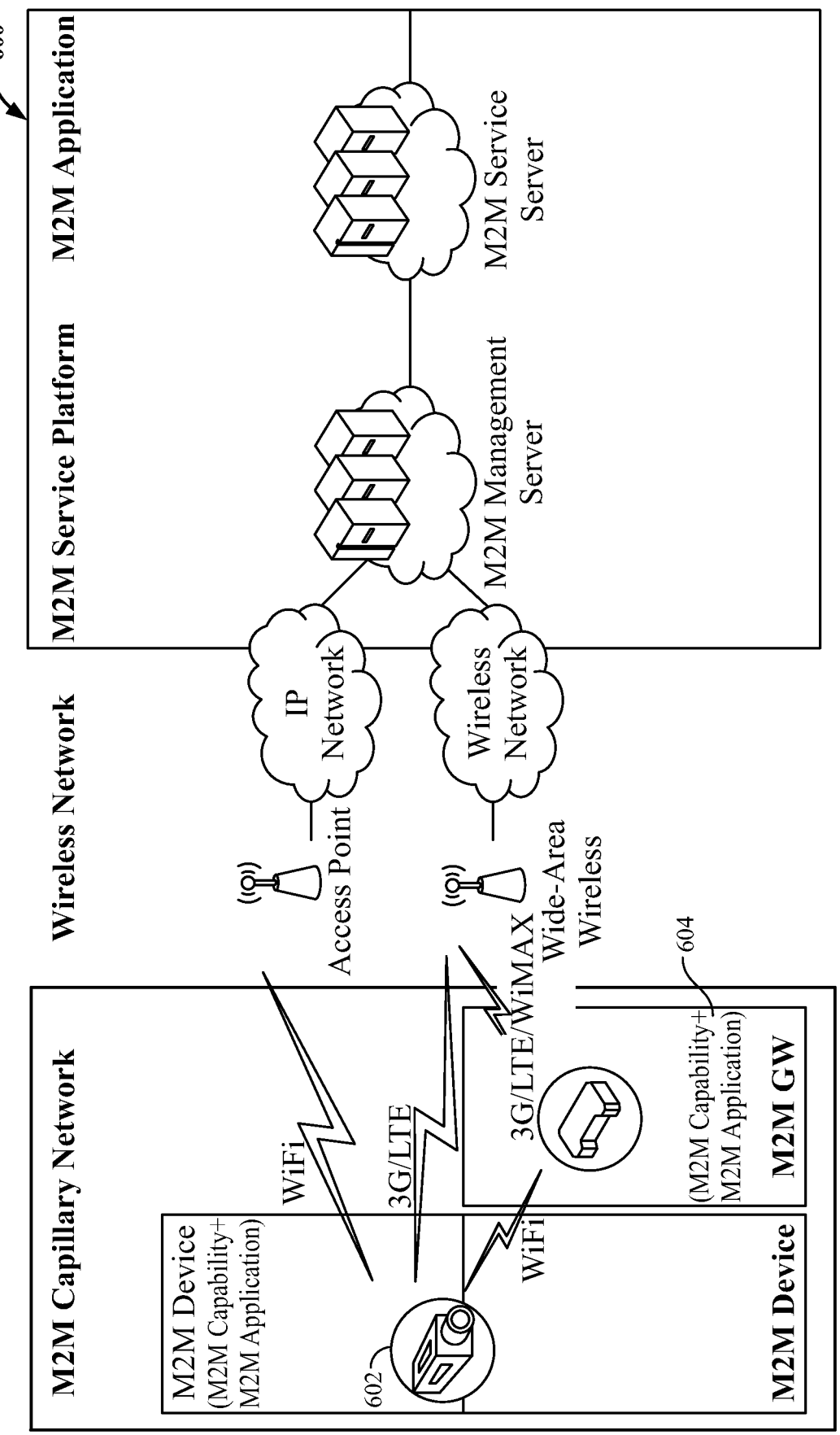
FIG. 6 is a diagram that illustrates an exemplary non-limiting architecture that supports remote data acquisition of the system of FIG. 5.

FIG. 5 is a diagram that illustrates a system 500 for streaming video from a surveillance camera. FIG. 6 is a diagram that illustrates an exemplary non-limiting architecture 600 that supports remote data acquisition of the system of FIG. 5.

In current M2M systems, data content is collected by the M2M device 602 that then publishes the data to the M2M Gateway 604 with which it registers. (The terms content, data, data content, resource, content resources, data resource, etc. may be used interchangeably.) The M2M Gateway 604 stores the data based on its resource structure (e.g., container or container under certain application in ETSI M2M Architecture).

An M2M application may be improved by the content resources acquired from another M2M application. For example, the remote control of a home appliance application, such as an air conditioner, may be greatly improved by home surveillance video. According to embodiments set forth herein, an air conditioner in each room of a house may be controlled individually based on video data indicating that a puppy is in a room (e.g., the temperature of the room where the puppy is may be set to a comfortable level by controlling the air conditioner in that room while the air conditioners in other rooms can be put into a sleep mode to save energy). A user may retrieve content resources from different applications at the same time. However, since the data content is stored on the M2M Gateway that the M2M Device registers to, the user may need to go to different M2M Gateways to retrieve the data content, which is not efficient. Even when content from different M2M devices is stored on the same M2M Gateway, a user would have to retrieve such content by issuing separate requests. By using the disclosed embodiments, an M2M Gateway may be able to detect correlations between various content associated with a user and the M2M Gateway may deliver the content proactively to the user with minimal waste of user and system resources.

In an embodiment, the data collected by an M2M Device may be stored at M2M Gateways or M2M Servers other than the one with which the M2M Device has a registration relationship. M2M Gateways or M2M Servers may be shared among different applications for content resource storing. M2M Devices may publish their content to M2M Gateways or M2M Servers, and all proposed functionalities are applicable to both scenarios.

Figure 7:
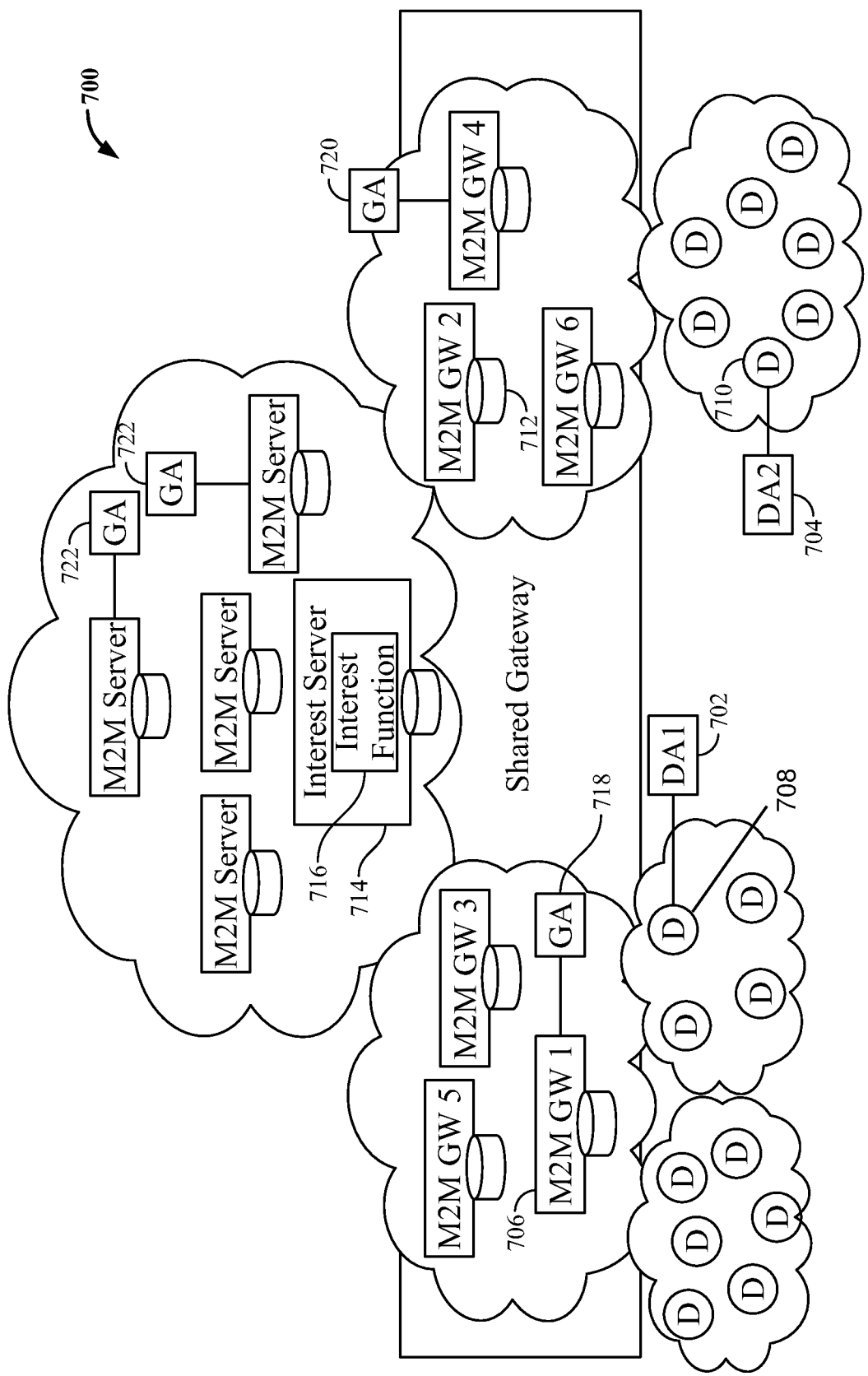
FIG. 7 is a diagram that shows an exemplary non-limiting M2M architecture.

FIG. 7 is a diagram that shows an architecture 700 which uses an Interest Function 716 in an Interest Server 714. In an embodiment, the M2M Interest Function 716 may be used to provide enhanced M2M data management. An M2M Interest Function 716 may accept a user's requests to publish the user's personal interests on data. The M2M Interest Function 716 may build up the data content association relationship that indicates the probability that a user would be interested in requesting data content associated with more than one M2M device simultaneously. An M2M Interest Function 716 may record a user's content request activities and/or provide such activities to one or more M2M Servers and/or M2M Gateways. By receiving and analyzing the information on user's content request activities, the M2M Interest Function 716 may find a pattern in the user's queries and automatically generate an interest record for the user and link the interested content data together. An M2M Interest Function 716 may maintain resource interest records based on its calculated best location to store the resource and provide a recommendation to the requesting M2M Gateways.

An M2M Interest Function 716 may accept the M2M Gateway queries for interest records as well as data content association relationship. This information may assist an M2M Gateway in choosing the best location to store the data content. The final storing location of content may be known by the M2M Interest Function 716 that may provide such information to a user who expresses interest in the content. The user may then request the content directly from the final storing location. An M2M Gateway may adjust content resource locations based on the interest record, data content association relationship or recommended storing location from the M2M Interest Function 716. A content resource may be moved from one M2M Gateway to another. In this way, an optimal average resource retrieval performance for a user may be achieved. Also set forth herein is an oneM2M embodiment of the M2M Interest Function, which can be a Common Service Function (CSF).

Different applications may share the same M2M Gateways for data resource storing. FIG. 7 shows an example where data collected by the M2M Devices in the Home Appliance Control application (DA1 702) and the Home Surveillance application (DA2 704) may be stored on a single M2M Gateway 706 (e.g., M2M Gateway 1 in FIG. 7), while the M2M devices 708 and 710 for the two applications may register to different M2M Gateways (e.g., M2M Gateway 1 706 and M2M Gateway 2 712, respectively in FIG. 7).

The M2M Interest Function 716 as set forth herein may provide enhanced M2M data management. The M2M Interest Function 716 may be placed on an M2M Gateway or an M2M Server as a special capability. Because it is more likely that users are connected to M2M Servers, in the following description, we assume that the Interest Function is located on an M2M Server, which may be referred to herein as an M2M Interest Server 714, for example as shown in FIG. 7. The M2M Interest Server 714 may maintain the interests of customers on the application data provided by the M2M Devices 708 and 710 and published to the M2M Gateways 706 and 712. In this example, the home owner is interested in the data from the Home Appliance Control Application and the Home Surveillance Application. In current M2M Architectures, the data content of the two device applications may be published and stored on two different M2M Gateways, due to the device applications being registered to the different M2M Gateways. For example, device 708 is registered to M2M Gateway 706 and device 710 is registered to Gateway 712. As a result, a user (e.g., DA 702 and 704, GA 718 and 720, NA 722 and 724 in FIG. 7) may be required to make two separate data content requests to different locations, which is not network or time efficient. But if the data content is placed on the same M2M Gateway 706, the content maybe retrieved by a single user request.

Figure 8:
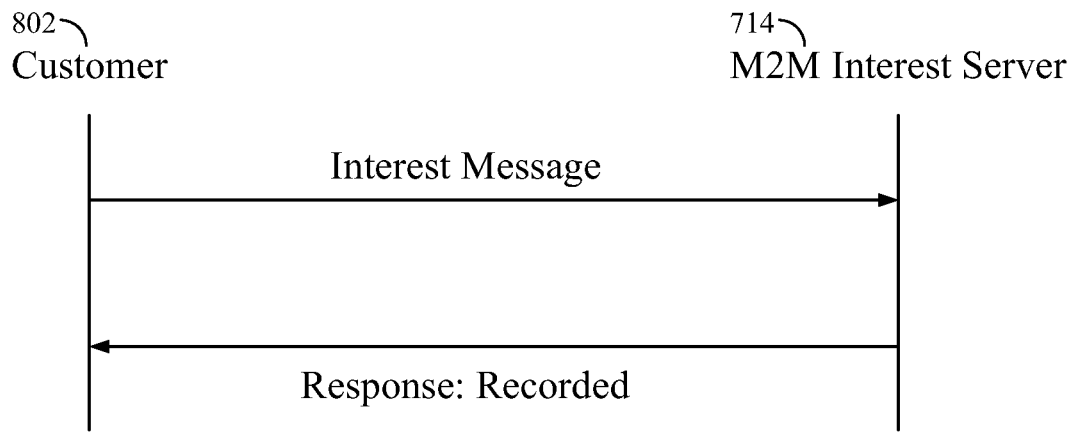
FIG. 8 is a signal flow diagram that illustrates the sending of an interest message from a customer to an M2M Interest Server and a response from the M2M Interest server.

An M2M Interest Server 714 may accept a user's request to publish the user's personal interests on data. FIG. 8 is a signal flow diagram that illustrates the sending of an interest message from a customer 802 to an M2M Interest Server 714 and a response from the M2M Interest Server 714. An M2M Interest Server 714 may link different data content together if a user is interested in requesting such content at the same time. In an embodiment, M2M Devices 708 and 710 may publish and store their data content on the same M2M Gateway 706 such that the data can be fetched by a single request and concatenated or batched together to be returned to a user. An M2M Interest Server 714 may build up the data content association relationship, which may indicate that it is very likely that a user would be interested in requesting data content from more than one M2M device simultaneously. This data content association relationship may be one factor that will be considered by the M2M Interest Server 714 in setting up a preferred location for a resource (see Table 1 below).

Figure 20A:
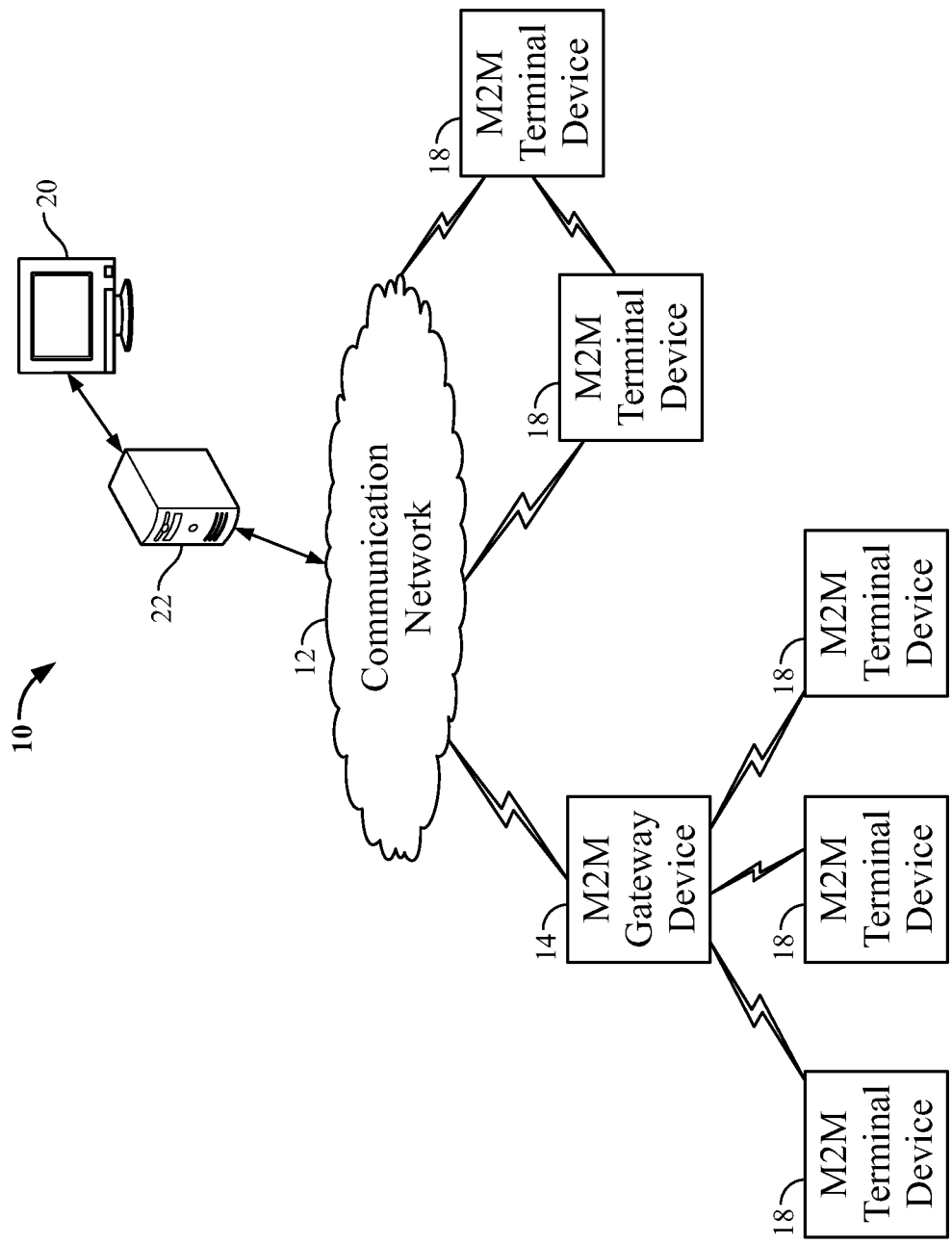
FIG. 20A is a system diagram of an example machine-to-machine (M2M) or Internet of Things (IoT) communication system in which one or more disclosed embodiments may be implemented.
Figure 20B:
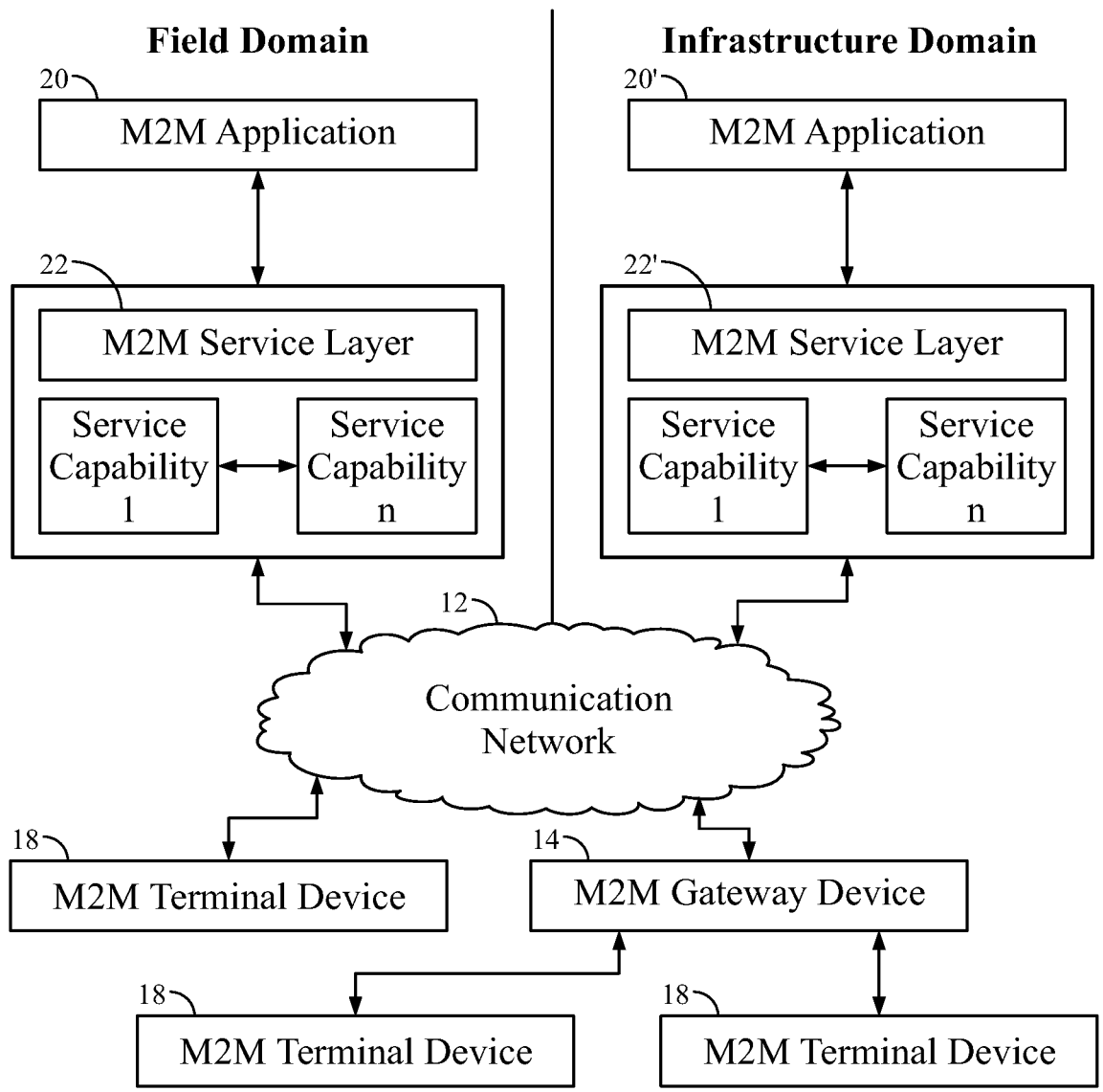
FIG. 20B is a system diagram of an example architecture that may be used within the M2M/IoT communications system illustrated in FIG. 20A.
Figure 20C:
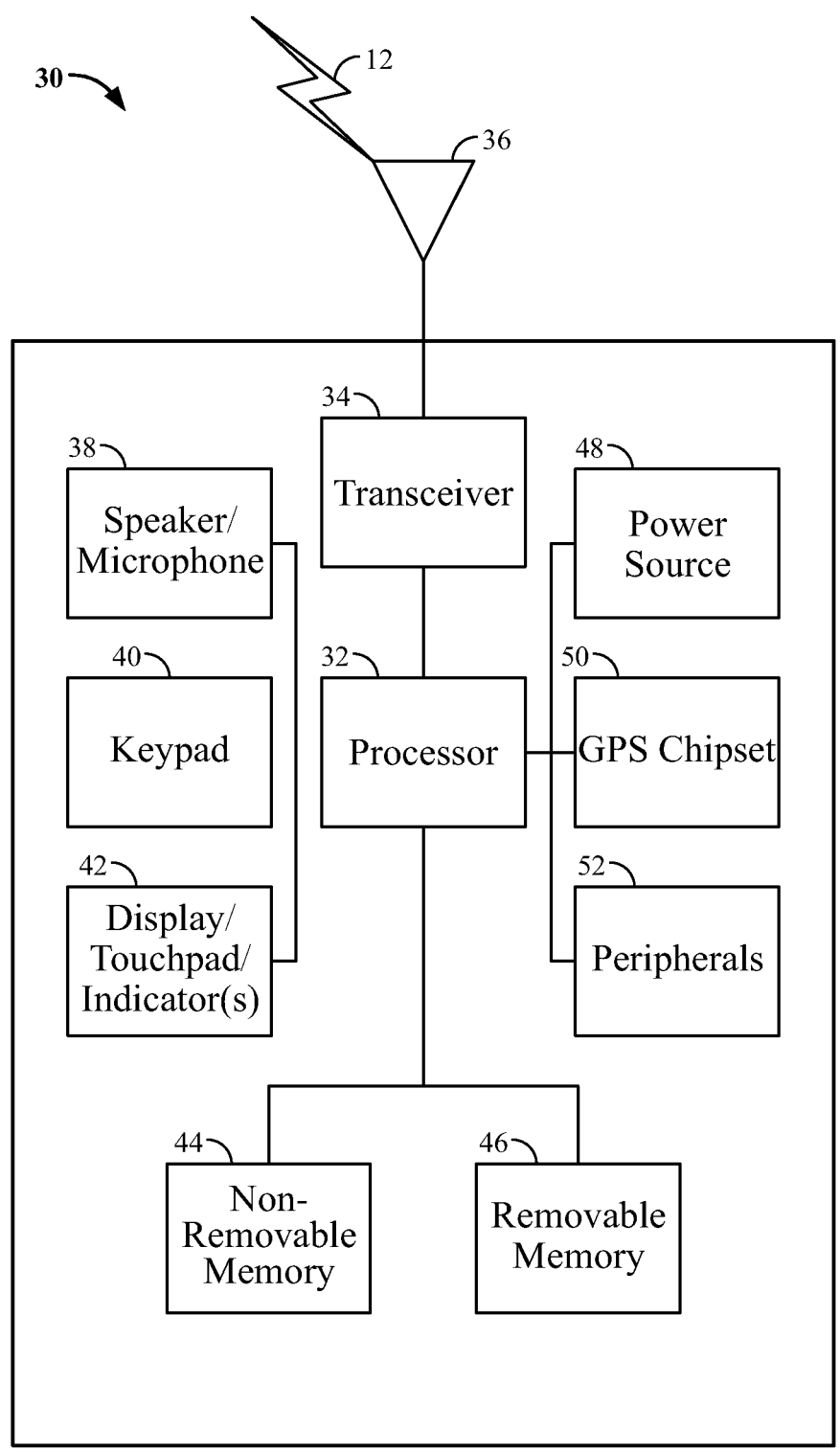
FIG. 20C is a system diagram of an example M2M/IoT terminal or gateway device that may be used within the communications system illustrated in FIG. 20A.
Figure 20D:
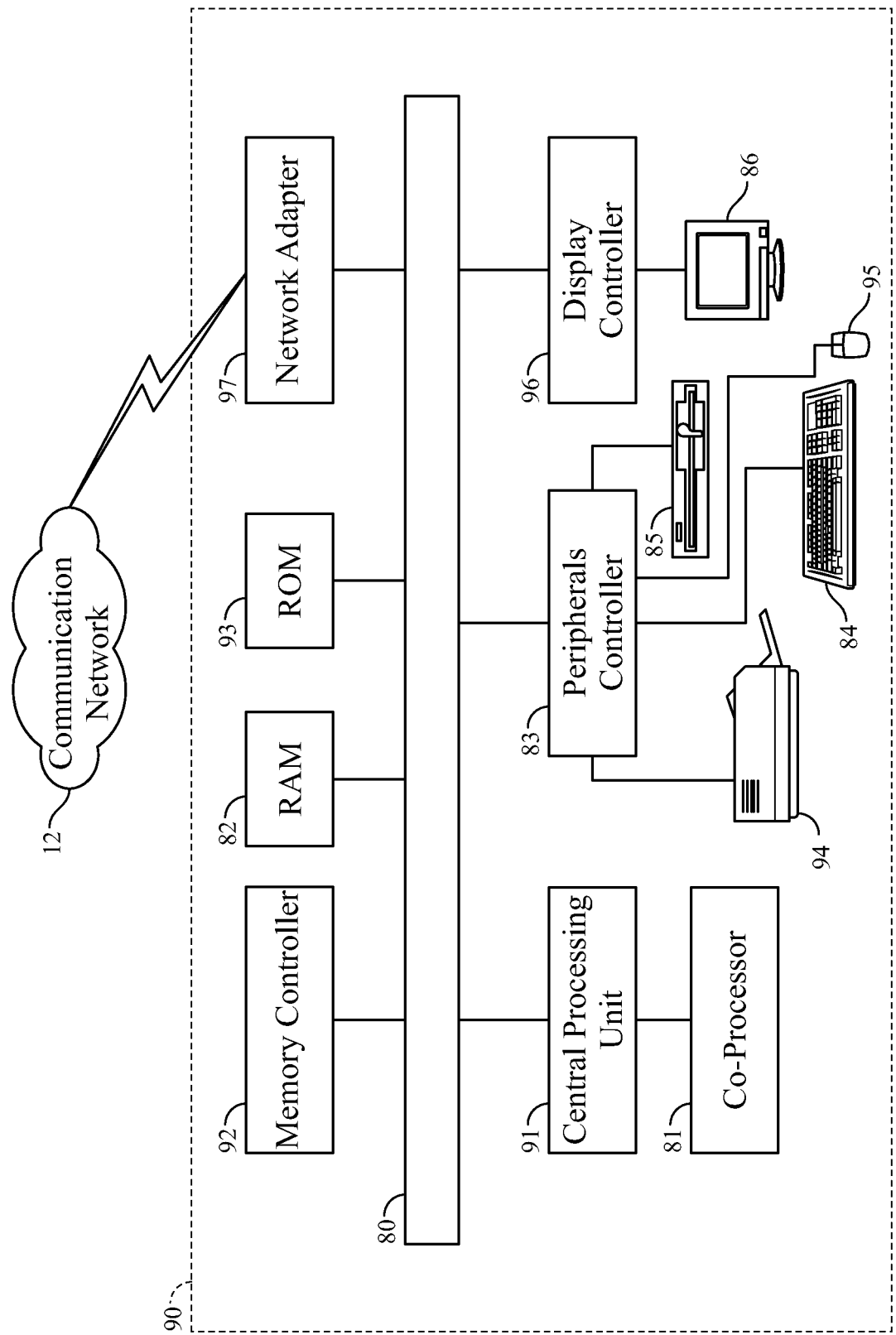
FIG. 20D is a block diagram of an example computing system in which aspects of the communication system of FIG. 20A may be embodied.

It is understood that the entities performing the steps illustrated in FIG. 8 are logical entities that may be implemented in the form of software (i.e., computer-executable instructions) stored in a memory of, and executing on a processor of, a device, server, or other computer system such as one of those illustrated in FIG. 20C or 20D. That is, the method(s) illustrated in FIG. 8 may be implemented in the form of software (i.e., computer-executable instructions) stored in a memory of a computing device, such as for example the device or computer system illustrated in FIG. 20C or 20D, which computer executable instructions, when executed by a processor of the computing device, perform the steps illustrated in FIG. 8.

Figure 9:
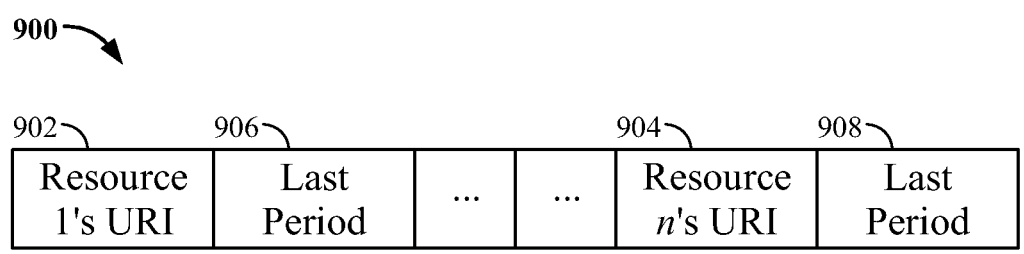
FIG. 9 is a diagram that illustrates an exemplary non-limiting message format of an interest message.

FIG. 9 is a diagram that illustrates an exemplary non-limiting message format 900 of an interest message. A user may indicate the user's interest to many resources in one interest message, which may include the resources' uniform resource identifiers (URI 902 and 904) and the corresponding time periods 906 and 908 in which the user may be interested in those resources.

Figure 10:
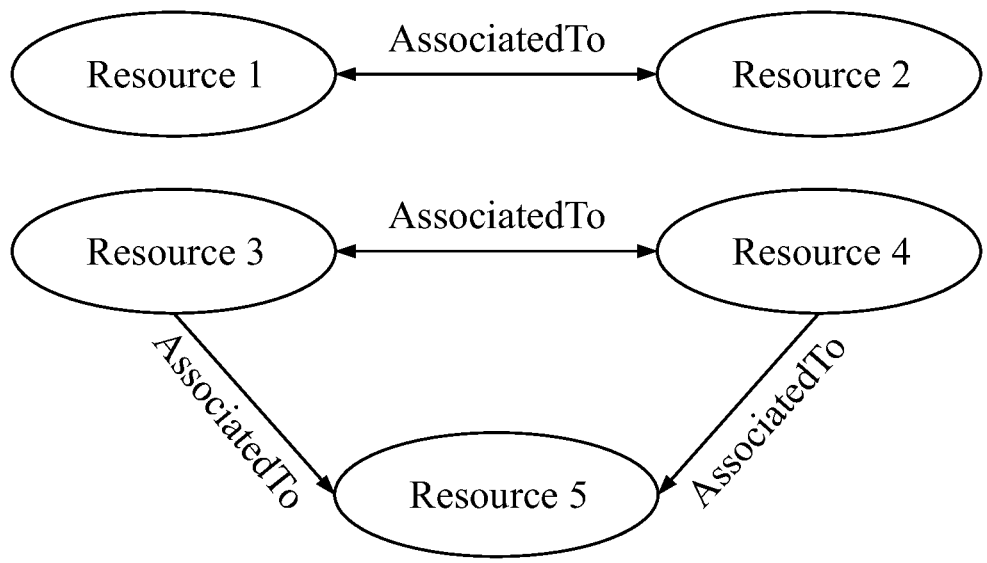
FIG. 10 is a block diagram that illustrates two examples of data content association relationships.

FIG. 10 is a block diagram that illustrates two examples of data content association relationships. The association relationship may be bidirectional or unidirectional. For example, a user of a remote control of home appliance application may be interested in data from a home surveillance video uploading application, but a not vice versa, so this particular data content association relationship is unidirectional.

Figure 11:
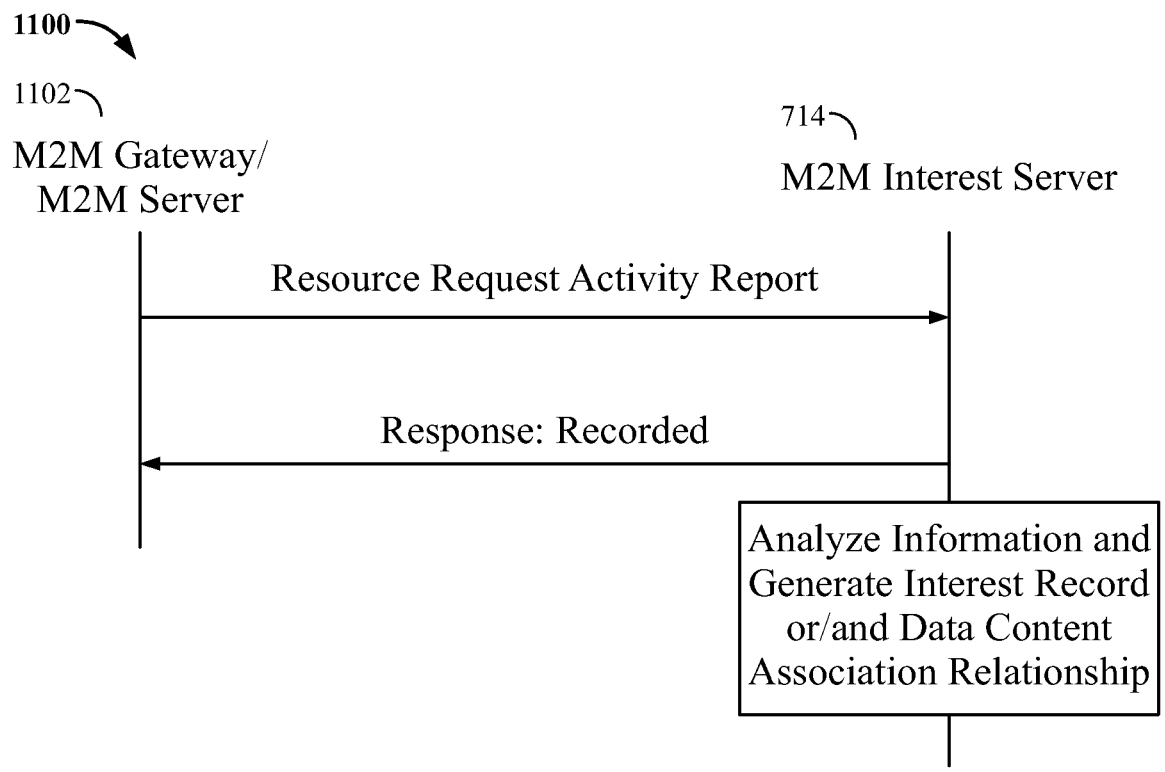
FIG. 11 is an exemplary flow diagram that illustrates an M2M Interest Server may that records a user's content request activities that are fed to the M2M Interest Function by the M2M Servers and M2M Gateways.

FIG. 11 is an exemplary flow diagram 1100 that illustrates an M2M Interest Server 714 that records a user's content request activities that are sent to the M2M Interest Function by the M2M Servers and M2M Gateways 1102. By receiving and analyzing the information on user content request activities, the M2M Interest Server 714 may find a pattern of user queries and may automatically generate an interest record for the user and link the interested content data together.

It is understood that the entities performing the steps illustrated in FIG. 11 are logical entities that may be implemented in the form of software (i.e., computer-executable instructions) stored in a memory of, and executing on a processor of, a device, server, or other computer system such as one of those illustrated in FIG. 20C or 20D. That is, the method(s) illustrated in FIG. 11 may be implemented in the form of software (i.e., computer-executable instructions) stored in a memory of a computing device, such as for example the device or computer system illustrated in FIG. 20C or 20D, which computer executable instructions, when executed by a processor of the computing device, perform the steps illustrated in FIG. 11.

Figures 12, 13:
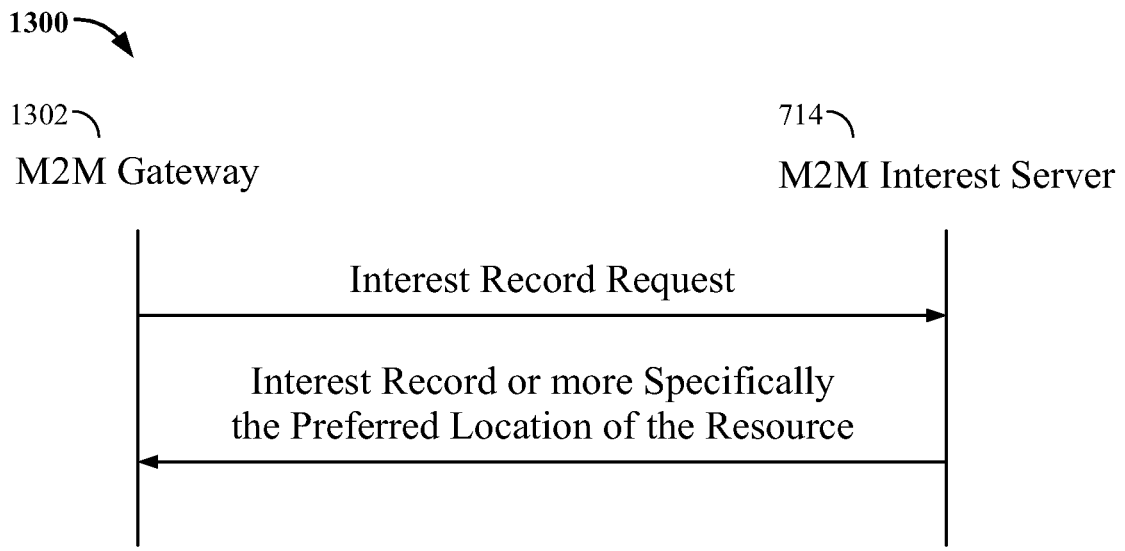
FIG. 12 is a diagram that illustrates an exemplary non-limiting resource request activity report 1200 is shown in FIG. 12, which shows the resources requested by various requesters and the time when the requests are made.
FIG. 13 is a flow diagram that illustrates an example of an interest record request message exchange.

FIG. 12 is a diagram that illustrates an exemplary non-limiting resource request activity report 1200 which shows the resources requested by various requesters and the time when the requests are made. The time records may be used to determine whether a user is interested in fetching two or more pieces of content together.

In an embodiment, an M2M Interest Server 714 may maintain the resource interest directory as shown below in Table 1. The M2M Interest Server 714 may generate an interest record based on the resource request activities of users or users may explicitly inform their interests in resources to the M2M Interest Server 714. In Table 1, a resource is represented by its URI. Note that a resource may be concrete content residing in a container, an application where all data collected from that application may be desirable to a user, or other forms. The Origin field shows the original publisher of the resource. The Customer field shows those users that are interested in the resource. Each user may be associated with a filter that may indicate its filtering criteria to a series of data that may be associated with the resource URI. For example, a user may be only interested in temperature sensing data that is lower than 50 degree Fahrenheit. And each user may have a predefined time period that the user's interest in a resource will last (indicated in the Last period field 906 in interest message 900 shown in FIG. 9). The M2M Interest Server 714 may calculate the best location in which to store the resource and provide a recommendation to requesting M2M Gateways.

In calculating the best storage location, an M2M Interest Server 714 may determine if the content is desired by users (e.g., network applications) that are attached to different M2M Servers. If so, it may be preferred that the content be stored in the M2M Gateway that offers the least average content retrieval latency to all users. Users may have different priorities (i.e., weights), so in some embodiments, the M2M Interest Server 714 may take such weights (i.e., priorities) of the users into account.

If the M2M Interest Server 714 discovers that certain content resources are likely to be requested by the same customers, and the content resources may be published by different M2M Devices 708 and 710 to their M2M Gateways 706 and 712, it may determine that it is desirable to store such content resources in the same M2M Gateway 706. For example, home owners may be interested in data collected both from a remote control of home appliance application and a home surveillance application. Thus the M2M Interest Server 714 may determine that it is preferable to store both data resources on the same M2M Gateway, although the two device applications 702 and 704 may be registered to other M2M Gateways 706 and 712.

TABLE 1

Resource Interest Directory

| Resource | Origin | Customer | Preferred Location | Final Storing Location (optional) |
|---|---|---|---|---|
| URI of the resource | Publisher of the resource | Customers that are interested in the resource (each is associated with an expiration time) | The preferred M2M Gateway to store the resource | The final storing location determined by the requesting M2M Gateway |

The M2M Interest Server 714 may accept one or more M2M Gateways' queries for the interest records as well as data content association relationship, which helps the M2M Gateway to choose the best location to publish and store the data content. In one embodiment, the M2M Gateways only request the preferred location from the M2M Interest Server.

FIG. 13 is a flow diagram 1300 that illustrates an example of an interest record request message exchange. When an M2M Gateway 1302 receives M2M data content delivered from an M2M Device, it may check the Interest Server 714 to see if there is an associated interest record for the content. The M2M Gateway 1302 may choose the best location to store the content in the M2M Gateway Layer. In other words, the content may be moved to another M2M Gateway that is the closest on average to the users who are interested in the content. The M2M Interest Server 714 may piggyback a request in the response to the M2M Gateway to return the final storing location for the content. If the M2M Gateway sees such request, it may return the final storing location of the content to the M2M Interest Server 714. The M2M Interest Server may provide the storage location from which the content may be retrieved to users if they send interest messages for the content. The M2M Interest Server may also adjust its strategy in determining the recommended storing locations for other content based on the feedback of final locations from the requesting M2M Gateways.

It is understood that the entities performing the steps illustrated in FIG. 13 are logical entities that may be implemented in the form of software (i.e., computer-executable instructions) stored in a memory of, and executing on a processor of, a device, server, or other computer system such as one of those illustrated in FIG. 20C or 20D. That is, the method(s) illustrated in FIG. 13 may be implemented in the form of software (i.e., computer-executable instructions) stored in a memory of a computing device, such as for example the device or computer system illustrated in FIG. 20C or 20D, which computer executable instructions, when executed by a processor of the computing device, perform the steps illustrated in FIG. 13.

Figure 14:
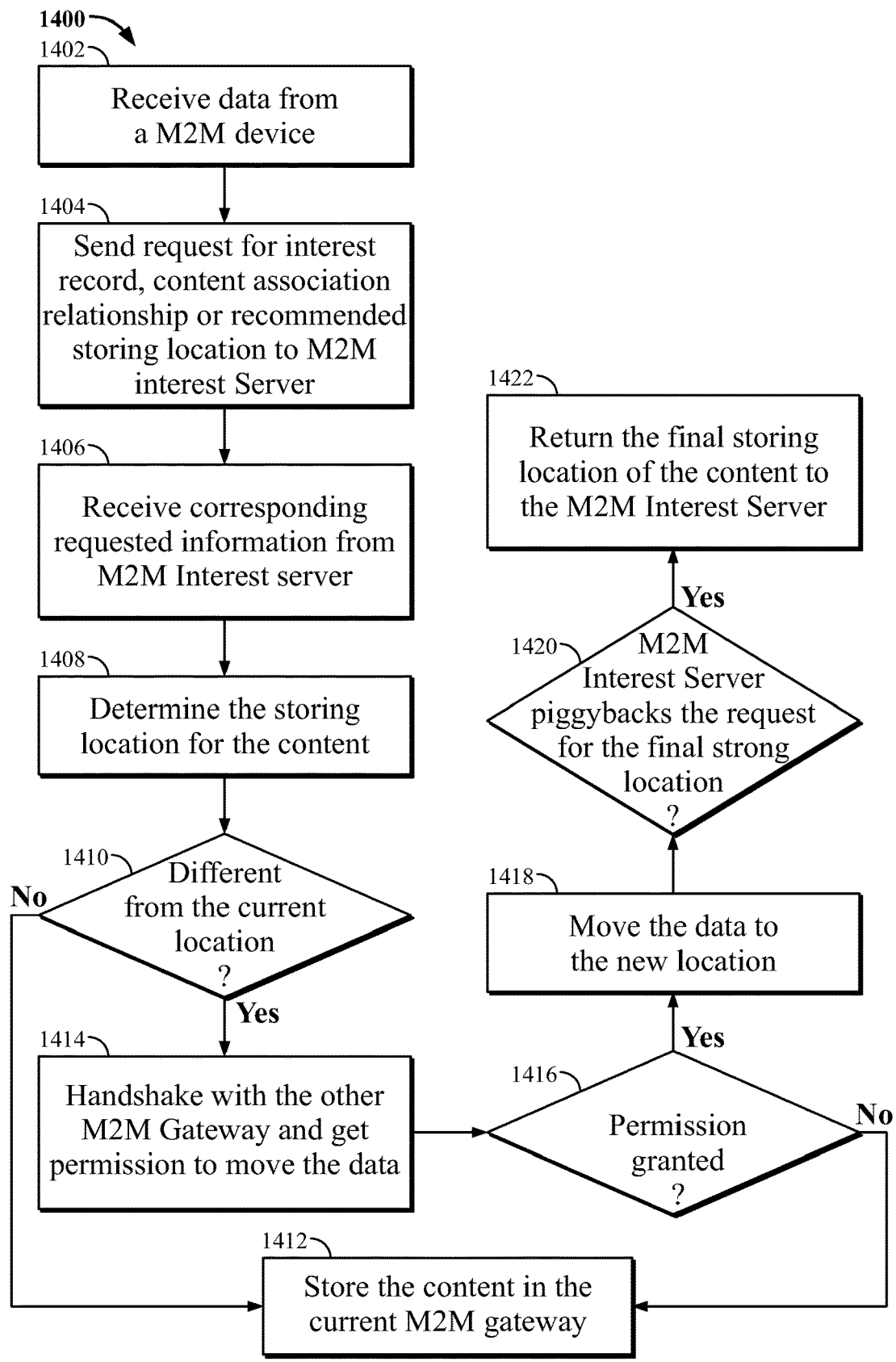
FIG. 14 is a flow chart that illustrates a process of an M2M Gateway managing a content's storage location and the interaction with the M2M Interest Server.

FIG. 14 is a flow chart 1400 that illustrates a process of an M2M Gateway managing a content's storage location and the interaction with the M2M Interest Server. Note, the M2M Gateway may maintain data indicating the final storage location of the content if it is not itself (i.e., the content is moved to be stored on another M2M Gateway).

In step 1402, data is received from an M2M device.

In step 1404, a request for an interest record, content association relationship or recommended startup location is sent to M2M Interest Server 714.

In step 1406, corresponding requested information is received from M2M Interest Server 714.

In step 1408, the storage location of the content is determined.

In step 1410, it is checked if the determined location is different than the current location. If the determined location is not different from current location, in step 1412, the content is stored in the current M2M gateway.

If the determined location is different from the current location, in step 1414, a handshake with the other M2M Gateway is done to get permission to move data to the other M2M Gateway.

In step 1416, if permissions is not granted, the content is stored in the current M2M Gateway in step 1412. If permission is granted, in step 1418, the data is moved to the new location.

If, in step 1420, the M2M Interest Server 714 piggybacks the request for the final storage location, in step 1422, the final storage location of the content is returned to the M2M Interest Server.

It is understood that the entities performing the steps illustrated in FIG. 14 may be logical entities that may be implemented in the form of software (i.e., computer-executable instructions) stored in a memory of, and executing on a processor of, a device, server, or other computer system such as one of those illustrated in FIG. 20C or 20D. That is, the method(s) illustrated in FIG. 14 may be implemented in the form of software (i.e., computer-executable instructions) stored in a memory of a computing device, such as for example the device or computer system illustrated in FIG. 20C or 20D, which computer executable instructions, when executed by a processor of the computing device, perform the steps illustrated in FIG. 14.

The preferred location of content may be dynamic if the users who are interested in the content are updated over time. The M2M Interest Server 714 may determine a new preferred content location that is different from the current one. The M2M Interest Server 714 may notify the M2M Gateway that may be the final storage location of the content, instructing it to migrate the content to the new preferred location. In one embodiment, such notification is only triggered when the M2M Interest Server knows that the content migration will result in better performance, such as reduced average content retrieval latency for all of the users interested in the content.

Figure 15:
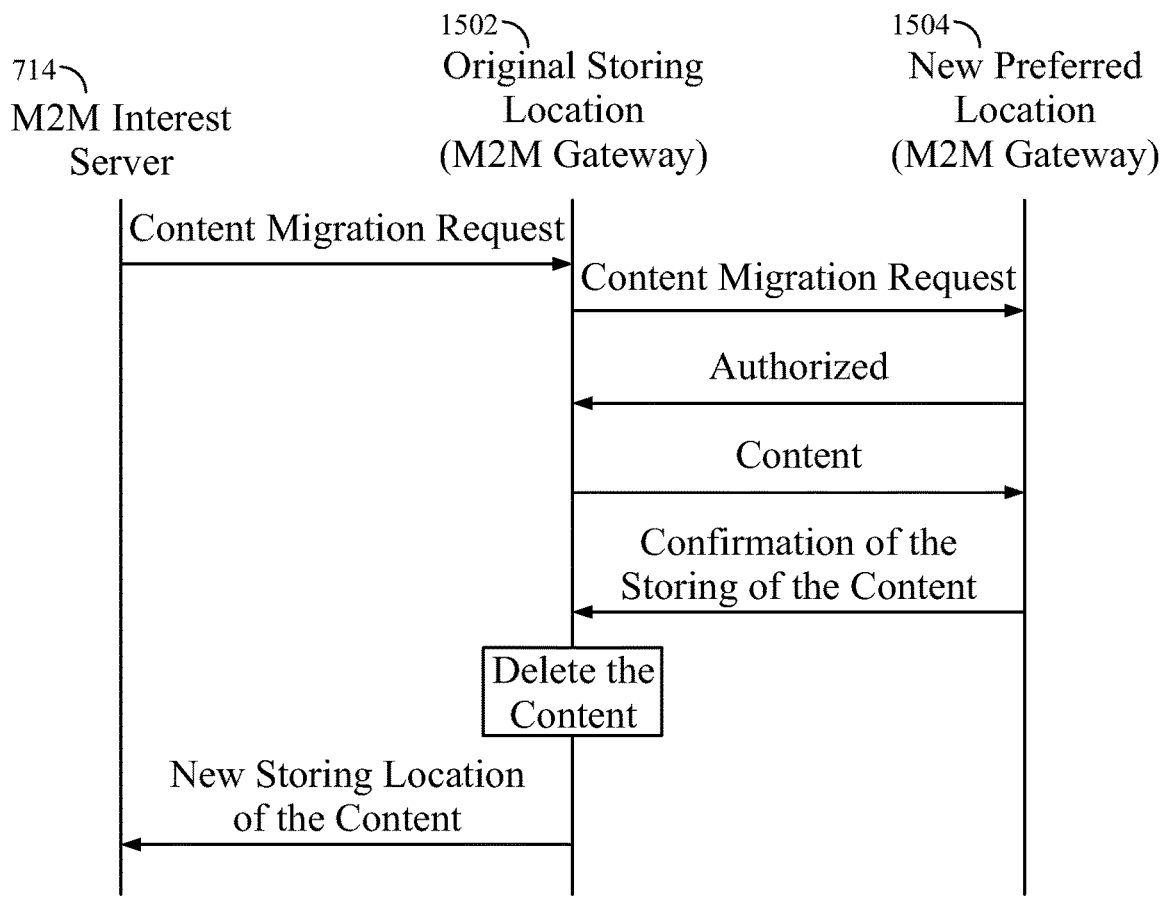
FIG. 15 is a signal flow diagram that illustrates the M2M Interest Server triggering content migration.

FIG. 15 is a signal flow diagram that illustrates the M2M Interest Server 714 triggering content migration from M2M Gateway 1502 to M2M Gateway 1504. A content migration request is received by M2M Gateway 1502 and forwarded to the new preferred location, M2M Gateway 1504. In this case, M2M Gateway 1504 authorized the switch and the content is transferred to the M2M Gateway 1504 and deleted from M2M Gateway 1502. The M2M Internet server 714 can then be notified of the new storage location. Note that the M2M Gateway 1504 may refuse the M2M Interest Server's recommendation of migrating the content to the new preferred location. In this case, a reject response may be sent back to the M2M Interest Server 714.

It is understood that the entities performing the steps illustrated in FIG. 15 may be logical entities that may be implemented in the form of software (i.e., computer-executable instructions) stored in a memory of, and executing on a processor of, a device, server, or other computer system such as one of those illustrated in FIG. 20C or 20D. That is, the method(s) illustrated in FIG. 15 may be implemented in the form of software (i.e., computer-executable instructions) stored in a memory of a computing device, such as for example the device or computer system illustrated in FIG. 20C or 20D, which computer executable instructions, when executed by a processor of the computing device, perform the steps illustrated in FIG. 15.

Figure 16:
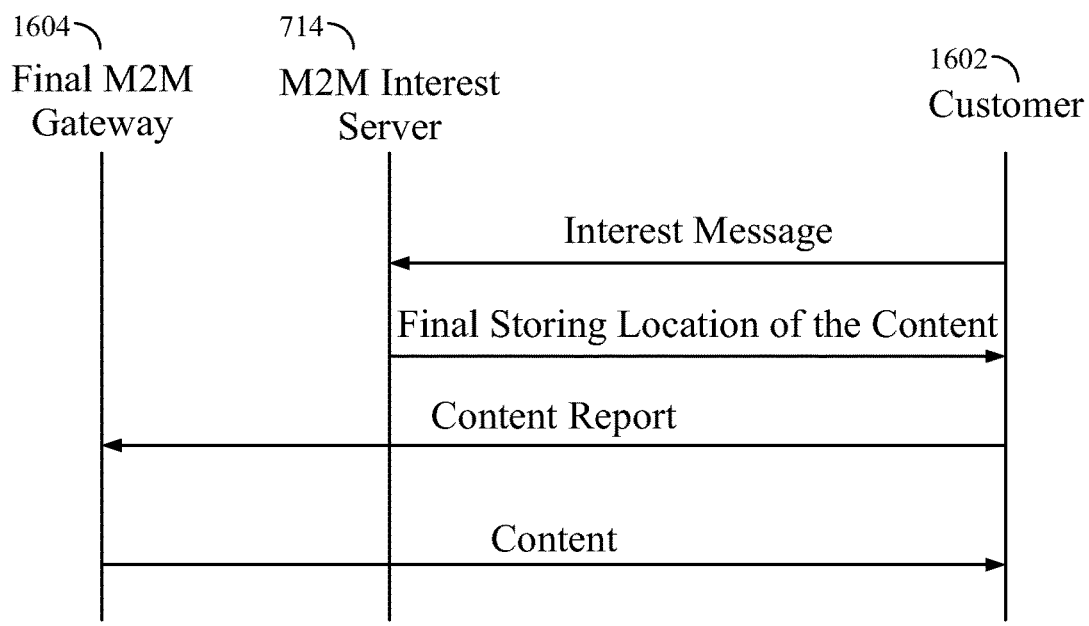
FIG. 16 is a flow diagram that illustrates a user expressing interest to an M2M Interest Server and the M2M Interest Server telling the user the final storing location of the content if it is available.

In an embodiment, a user may express interest in content to the M2M Interest Server 714 before it requests the content from the original M2M Gateway. FIG. 16 is a flow diagram that illustrates a user 1602 expressing interest to an M2M Interest Server 714 and the M2M Interest Server 714 telling the user 1602 the final storing location 1604 of the content if it is available. The user 1602 may go to the final M2M Gateway 1604 to request the content.

It is understood that the entities performing the steps illustrated in FIG. 16 are logical entities that may be implemented in the form of software (i.e., computer-executable instructions) stored in a memory of, and executing on a processor of, a device, server, or other computer system such as one of those illustrated in FIG. 20C or 20D. That is, the method(s) illustrated in FIG. 16 may be implemented in the form of software (i.e., computer-executable instructions) stored in a memory of a computing device, such as for example the device or computer system illustrated in FIG. 20C or 20D, which computer executable instructions, when executed by a processor of the computing device, perform the steps illustrated in FIG. 16.

Figure 17:
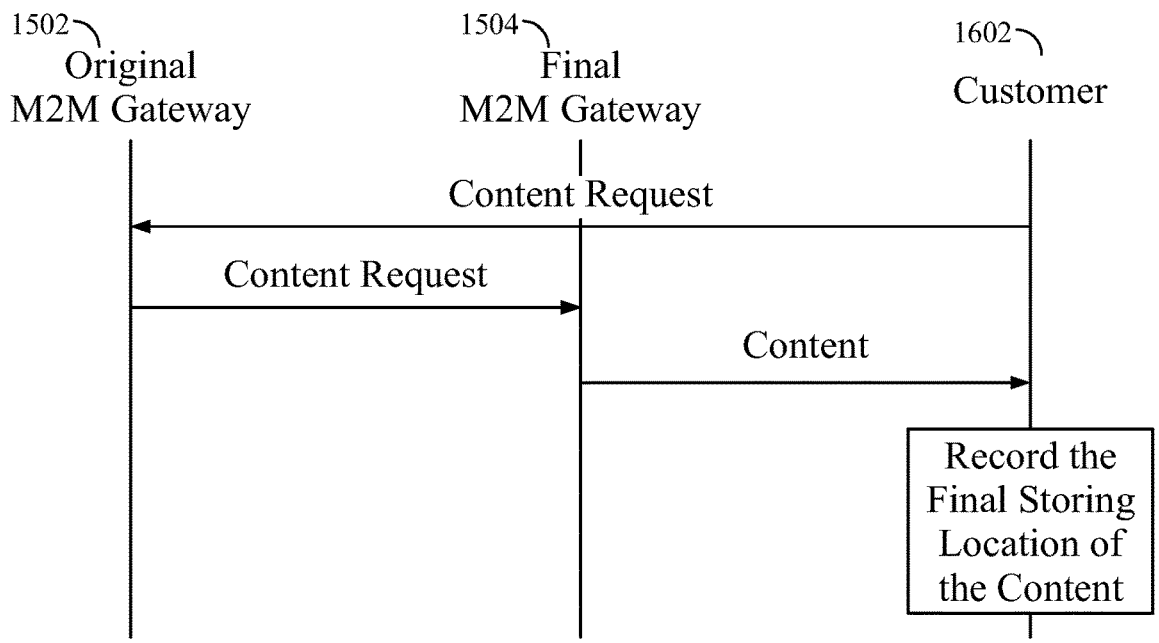
FIG. 17 is a flow diagram that illustrates a case where a user did not report interest on the content to the M2M Interest Server.

FIG. 17 is a flow diagram that illustrates a case where a user did not report interest on the content to the M2M Interest Server 714, and thus was not aware of the new storing location of the content. In this case, the user may request the content directly from the original M2M Gateway 1502. The original M2M Gateway 1502 may forward the request to the final M2M Gateway 1504, from which the content may be returned to the customer.

It is understood that the entities performing the steps illustrated in FIG. 17 may be logical entities that may be implemented in the form of software (i.e., computer-executable instructions) stored in a memory of, and executing on a processor of, a device, server, or other computer system such as one of those illustrated in FIG. 20C or 20D. That is, the method(s) illustrated in FIG. 17 may be implemented in the form of software (i.e., computer-executable instructions) stored in a memory of a computing device, such as for example the device or computer system illustrated in FIG. 20C or 20D, which computer executable instructions, when executed by a processor of the computing device, perform the steps illustrated in FIG. 17

Figure 18:
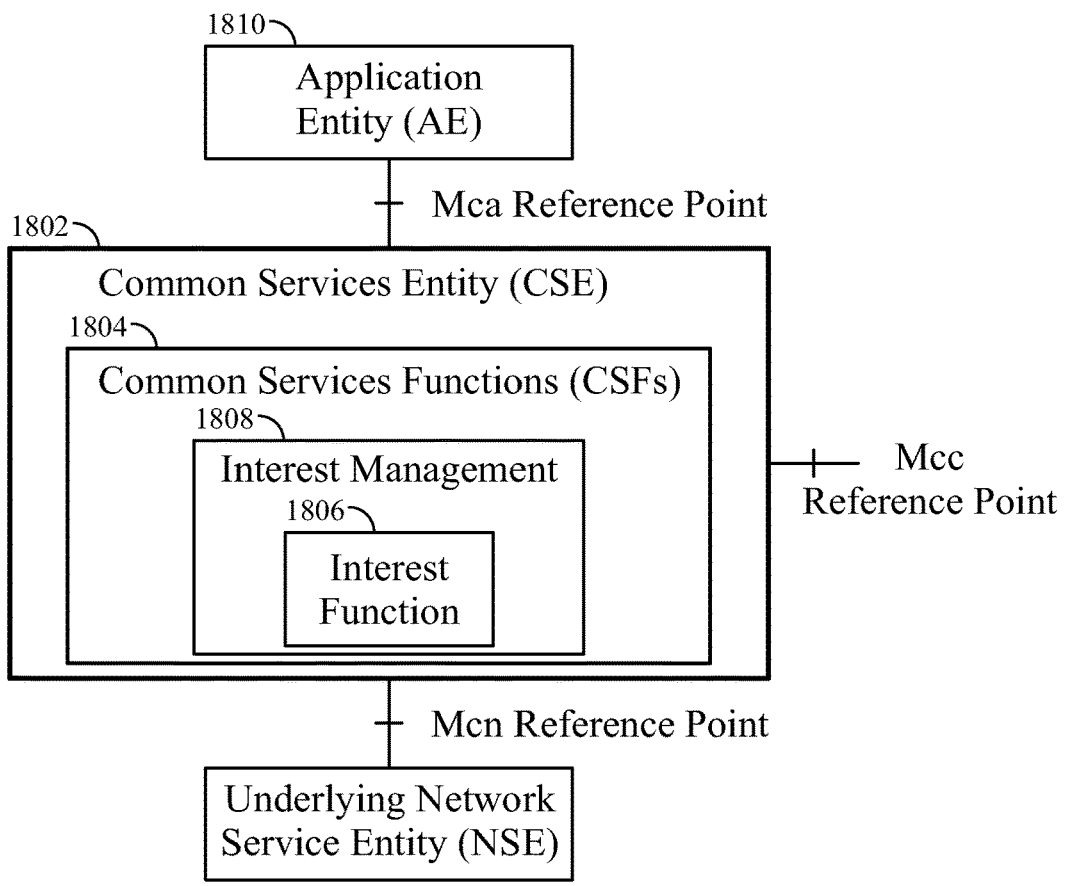
FIG. 18 is a diagram that illustrates a oneM2M embodiment.

A FIG. 18 is a diagram that illustrates a one M2M embodiment. oneM2M defines the capabilities supported by the oneM2M service layer, which are referred to as Capability Service Functions (CSFs 1804). The oneM2M service layer is referred to as a Capability Services Entity (CSE 1802). In one embodiment, the proposed M2M Interest Function 1806 may be hosted in Interest Management CSF 1808 as a oneM2M CSF.

AEs 1810 will talk to Interest Management CSF 1808 via Mca reference point to report their interests on resources or request the storing locations of resources. Other CSEs may also talk to Interest Management CSF 1808 via Mcc reference point to report their interests on resources or request the storing locations of resources. CSEs on gateways and servers may move the content to a preferred location based on the interest records via Mcc Reference point.

AEs 1810 will talk to Interest Management CSF 1808 via Mca reference point to report their interests on resources or request the storing locations of resources. Other CSEs may also talk to Interest Management CSF 1808 via Mcc reference point to report their interests on resources or request the storing locations of resources. CSEs on gateways and servers may move the content to a preferred location based on the interest records via Mcc Reference point.

FIG. 19A is a diagram that illustrates a graphical use interface 1902 that allows the interest function disclosed above to be enabled and disabled. A user can use interface 1902 to determine whether to enable the interest function described above.

FIG. 19B is a diagram that illustrates a graphical user interface 1904 that allows a user to select and show user interest data. A user can use interface 1904 to select user interest data that they want to be stored a local gateway, for example.

FIG. 19C is a diagram that illustrates a graphical user interface 1906 to request an interest group location such as server A, B or C. A user can use interface 1906 to select the local gateway where they want their interest data stored.

The user interfaces 1902, 1904 and 1906 shown in FIGS. 19A-C may be displayed using a display such as display 42 of FIG. 20C or display 86 of FIG. 20D discussed below.

FIG. 20A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc. Communication system 10 can be used to implement functionality of the disclosed embodiments and can include functionality and logical entities such as Interest Server 714, Interest Function 714 and 1806, Interest Management CSF 1808, as well as logical entities at the M2M Gateways 706, 712, 1102, 1302, 1502, 1504 and 1604, M2M Gateways 706 and 712 and logical entities to produce the user interfaces shown in FIGS. 19 A-C.

As shown in FIG. 20A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 20A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Exemplary M2M devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 20B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as Interest Server 714, Interest Function 714 and 1806, Interest Management CSF 1808, as well as logical entities at the M2M Gateways 706, 712, 1102, 1302, 1502, 1504 and 1604, and logical entities to produce the user interfaces shown in FIGS. 19A-C. The M2M service layer 22 may be implemented by one or more servers, computers, devices, virtual machines (e.g. cloud/storage farms, etc.) or the like, including for example the devices illustrated in FIGS. 20C and 20D described below. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc. Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g. cloud/compute/storage farms, etc.) or the like.

Referring also to FIG. 20B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide. The connection methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE)

which can be hosted on different types of network nodes (e.g. infrastructure node, middle node, application-specific node). Further, connection methods of the present application can be implemented as part of an M2M network that uses a Service Oriented Architecture (SOA) and/or a resource-oriented architecture (ROA) to access services such as the connection methods of the present application.

In some embodiments, M2M applications 20 and 20' may include the applications that interact with capillary devices and therefore may be used in conjunction with the disclosed systems and methods. The M2M applications 20 and 20' may include the applications that interact with the UE or gateway and may also be used in conjunction with other disclosed charging systems and methods. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities is provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or as some other component or module of a network, the service layer may be implemented as a logical entity (e.g., software, computer-executable instructions, and the like) executing either on one or more standalone servers, computers, or other computing devices or nodes in the network or as part of one or more existing servers, computers, or nodes of such network. As an example, a service layer or component thereof may be implemented in the form of software running on a server, computer, or device having the general architecture illustrated in FIG. 20C or FIG. 20D described below.

Further, the logical entities of the present application such as such as Interest Server 714, Interest Function 714 and 1806, Interest Management CSF 1808, as well as logical entities at the M2M Gateways 706 712, 1102, 1302, 1502, 1504 and 1604 and logical entities to produce the user interfaces shown in FIGS. 19A-C can implemented as part of an M2M network that uses a Service Oriented Architecture (SOA) and/or a resource-oriented architecture (ROA) to access services of the present application.

FIG. 20C is a system diagram of an example device 30, that can be an M2M device, user equipment, gateway, UE/GW or any other nodes including nodes of the mobile care network, service layer network application provider, terminal device 18 or an M2M gateway device 14 for example. The device 30 can execute or include logical entities such as Interest Server 714, Interest Function 714 and 1806, Interest Management CSF 1808, as well as logical entities at the M2M Gateways 706 712, 1102, 1302, 1502, 1504 and 1604 and logical entities to produce the user interfaces shown in FIGS. 19A-C. The device 30 can be part of an M2M network as shown in FIG. 20A-B or part of a non-M2M network. As shown in FIG. 20C, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the device 30 may include any sub-combination of the foregoing elements while remaining consistent with an embodiment. This device may be a device that uses and/or implements the disclosed systems and methods.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 20C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 20C as a single element, the device 30 may include any number of transmit/receive elements 36. More specifically, the device 30 may employ MIMO technology.

Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 20D is a block diagram of an exemplary computing system 90 on which, for example, the M2M service platform 22 of FIGS. 20A and 20B may be implemented. Computing system 90 may comprise a computer or server and may be controlled primarily by computer readable instructions, which may be in the form of software, wherever, or by whatever means such software is stored or accessed. Computing system 90 can execute or include logical entities such as Interest Server 714, Interest Function 714 and 1806, Interest Management CSF 1808, as well as logical entities at the M2M Gateways 706 712, 1102, 1302, 1502, 1504 and 1604 and logical entities to produce the user interfaces shown in FIGS. 19A-C. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process the data used in various embodiments of the disclosed systems.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 20A and 20 B. In an embodiment, network adaptor 97 may receive and transmit data used by various disclosed systems and methods.

It is understood that any or all of the systems, methods, and processes described herein may be embodied in the form of computer executable instructions (i.e., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as Interest Server 714, Interest Function 714 and 1806, Interest Management CSF 1808, as well as logical entities at the M2M Gateways 706 712, 1102, 1302, 1502, 1504 and 1604 and logical entities to produce the user interfaces shown in FIGS. 19A-C may be embodied in the form of the computer executable instructions stored on a computer-readable storage medium. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the FIGS., specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use by a Machine-to-Machine (M2M) Interest server connected to a network, wherein the M2M Interest server comprises a processor and memory, and wherein the server further includes computer-executable instructions stored in the memory which, when executed by the processor, perform functions of an interest server in the network, the method comprising:

receiving, by the M2M Interest server from an application associated with a user via the network, indications of interest for data, wherein the indications of interest for data comprises filtering criteria corresponding to each respective device of multiple machine-to-machine (M2M) devices;

based on the received indications of interest for the data, determining, by the M2M Interest server, a best location recommendation for storing multiple content resources together based on a strategy, wherein the multiple content resources may be interested or requested by the application associated with the user together;

storing the determined best location recommendation for storing multiple content resources together;

providing the determined best location for multiple content resources to a network entity upon its request for the multiple content resources;

providing the determined best location to requesting M2M gateways;

receiving feedback from the requesting M2M gateways; and adjusting, by the M2M Interest server, the strategy in determining the best location recommendation based on the feedback for other content.

2. A Machine-to-Machine (M2M) Interest server comprising a processor, a memory, and communication circuitry, the M2M Interest server being connected to a communications network via its communication circuitry, the M2M Interest server further including computer-executable instructions stored in the memory of the M2M Interest server which, when executed by the processor of the M2M Interest server, cause the M2M Interest server to:

receive, from an application associated with a user via the network, indications of interest for data, wherein the indications of interest for data comprises filtering criteria corresponding to each respective device of multiple machine-to-machine (M2M) devices, and wherein the reports of data request activities comprise identifiers of data requesters, content resources that each data requester requested, and time when each data requester requested;

based on the received indications of interest for the data and the reports of data request activities, determine, a best location for storing multiple content resources together based on a strategy, wherein the multiple content resources may be interested or requested by the application associated with the user together;

storing the determined best location recommendation for storing multiple content resources together;

providing the determined best location for multiple content resources to a network entity upon its request for the multiple content resources;

providing the determined best location to requesting M2M gateways;

receiving feedback from the requesting M2M gateways; and adjusting the strategy in determining the best location recommendation based on the feedback for other content.

3. A system for use by a Machine-to-Machine (M2M) Interest server, the system comprising:

one or more processors; and memory coupled with the one or more processors, the memory storing executable instructions that when executed by the one or more processors cause the one or more processors to effectuate operations comprising:

receiving, from an application associated with a user via the network, indications of interest for data, wherein the indications of interest for data comprises filtering criteria corresponding to each respective device of multiple machine-to-machine (M2M) devices;

based on the received indications of interest for the data, determining a best location recommendation for storing multiple content resources together based on a strategy, wherein the multiple content resources may be interested or requested by the application associated with the user together;

storing the determined best location recommendation for storing multiple content resources together;

providing the determined best location for multiple content resources to a network entity upon its request for the multiple content resources;

providing the determined best location to requesting M2M gateways;
receiving feedback from the requesting M2M gateways; and
adjusting the strategy in determining the best location recommendation based on the feedback for other content.

* * * * *